(12) United States Patent
Conrad

(10) Patent No.: US 8,484,799 B2
(45) Date of Patent: Jul. 16, 2013

(54) CYCLONE CHAMBER AND DIRT COLLECTION ASSEMBLY FOR A SURFACE CLEANING APPARATUS

(75) Inventor: Wayne Ernest Conrad, Hampton (CA)

(73) Assignee: G.B.D. Corp., Nassau (BS)

( * ) Notice: Subject to any disclaimer, the term of this patent is extended or adjusted under 35 U.S.C. 154(b) by 277 days.

(21) Appl. No.: 13/039,850

(22) Filed: Mar. 3, 2011

(65) Prior Publication Data

US 2012/0222244 A1 Sep. 6, 2012

(51) Int. Cl.
*A47L 9/16* (2006.01)
(52) U.S. Cl.
USPC ............................................... 15/353; 15/347
(58) Field of Classification Search
USPC ........... 15/347, 352, 353, 327.2, 327.6, 327.7
See application file for complete search history.

(56) References Cited

U.S. PATENT DOCUMENTS

| | | | |
|---|---|---|---|
| 7,162,770 B2 * | 1/2007 | Davidshofer | 15/353 |
| 7,198,656 B2 * | 4/2007 | Takemoto et al. | 55/337 |
| 7,547,337 B2 * | 6/2009 | Oh et al. | 55/345 |
| 2009/0205160 A1 | 8/2009 | Conrad | |
| 2009/0205161 A1 | 8/2009 | Conrad | |
| 2010/0175217 A1 | 7/2010 | Conrad | |
| 2010/0212104 A1 | 8/2010 | Conrad | |
| 2010/0242210 A1 | 9/2010 | Conrad | |
| 2010/0243158 A1 | 9/2010 | Conrad | |
| 2010/0299865 A1 | 12/2010 | Conrad | |
| 2010/0299866 A1 | 12/2010 | Conrad | |
| 2011/0146024 A1 | 6/2011 | Conrad | |
| 2012/0222245 A1 * | 9/2012 | Conrad | 15/347 |
| 2012/0222262 A1 * | 9/2012 | Conrad | 15/412 |

FOREIGN PATENT DOCUMENTS

| | | |
|---|---|---|
| CA | 2659212 | 9/2010 |
| WO | 2010102396 | 9/2010 |

\* cited by examiner

*Primary Examiner* — Dung Van Nguyen
(74) *Attorney, Agent, or Firm* — Philip C. Mendes da Costa; Bereskin & Parr LLP/ S.E.n.C.R.L., s.r.l.

(57) ABSTRACT

A cyclone bin assembly comprises a dirt collection chamber in communication with a dirt outlet of a cyclone chamber. The dirt collection chamber comprises a first and second opposed ends and comprises a first and portions. The dirt outlet is positioned adjacent the second opposed end of the dirt collection chamber. The first and second portions may comprise discrete chambers that are separated from each other by a passage extending between the dirt outlet and a wall of the dirt collection chamber. The first and second portions may have first and second sides. The first side is positioned adjacent the passage and the second side is angularly spaced from the passage. The second portion has a divider wall that extends towards the second opposed end of the dirt collection chamber from the first opposed end of the dirt collection chamber. The divider wall may be spaced from the second side.

21 Claims, 16 Drawing Sheets

CYCLONE CHAMBER AND DIRT COLLECTION ASSEMBLY FOR A SURFACE CLEANING APPARATUS

FIELD

The disclosure relates to a cyclone bin assembly such as may be used in surface cleaning apparatuses, such as vacuum cleaners.

INTRODUCTION

Various constructions for surface cleaning apparatuses, such as vacuum cleaners, are known. Currently, many surface cleaning apparatuses are constructed using at least one cyclonic cleaning stage. Air is drawn into the vacuum cleaners through a dirty air inlet and conveyed to a cyclone inlet. The rotation of the air in the cyclone results in some of the particulate matter in the airflow stream being disentrained from the airflow stream. This material is then collected in a dirt bin collection chamber, which may be at the bottom of the cyclone or in a direct collection chamber exterior to the cyclone chamber (see for example WO2009/026709 and U.S. Pat. No. 5,078,761). One or more additional cyclonic cleaning stages and/or filters may be positioned downstream from the cyclone.

SUMMARY

The following summary is provided to introduce the reader to the more detailed discussion to follow. The summary is not intended to limit or define the claims.

According to one aspect, a cyclone bin assembly comprises a dirt collection chamber having two portions wherein one of the portions, and preferably the downstream portion, has a dirt collection surface that is located behind or below (depending upon orientation) a divider wall. Air may circulate or swirl in the portion of the dirt collection chamber above or in front of the divider wall. The divider wall is positioned to provide a partial break between the air that is in movement and the surface on which particulate matter may accumulate. The divider wall may cause air to travel above the settled particulate matter, thereby reducing re-entrainment. Further, the divider wall may direct air away from the surface on which particulate matter has accumulates and thereby provide a wind shadow in which light particulate matter may settle.

Preferably, air which has some entrained dirt leaves a cyclone chamber through, e.g., a slot outlet. The air may be directed to a first or upstream portion of the dirt collection chamber where particulate matter is deposited. The air may then travel to a second or downstream portion of the dirt collection chamber. The air circulates within the second portion wherein fine particulate matter may settle out. The air then returns to the cyclone chamber via the dirt outlet.

The dirt chamber may include a diverter wall separating the interior of the dirt collection chamber into two separate portions, connected by a passageway. Dirty air can flow through the passageway, between the first and second portions. The diverter wall is positioned proximate the dirt outlet of the cyclone chamber, and may be configured to accelerate the air flow passing through the passage. Alternately, or in addition, the dirt outlet of the cyclone chamber is asymmetrically arranged relative to the first and second portions so as to direct more airflow into the first portion of the dirt collection chamber then the second, downstream portion.

An advantage of this is that it the percentage of finer particulate matter that is disentrained from the air stream may be increased.

In accordance with this aspect, a cyclone bin assembly may comprise a cyclone chamber having an air inlet, an air outlet, a dirt outlet and first and second opposed ends. The cyclone bin assembly may comprise a dirt collection chamber in communication with the dirt outlet and surrounding at least a portion of the cyclone chamber. The dirt collection chamber may comprise a first opposed end and a second opposed end and may comprise a first portion and a second portion. The dirt outlet may be positioned adjacent the second opposed end of the dirt collection chamber. The first portion and the second portion may comprise discrete chambers that are separated from each other by a passage extending between the dirt outlet and a wall of the dirt collection chamber. The first and second portions may have first and second sides. The first side may be positioned adjacent the passage and the second side may be angularly spaced from the passage. The second portion may have a divider wall that extends inwardly towards the second opposed end of the dirt collection chamber from the first opposed end of the dirt collection chamber. The divider wall may be spaced from the second side.

The divider wall may be positioned adjacent the first side.

A portion of the wall facing the dirt outlet may extend inwardly towards the dirt outlet.

The cyclone chamber may have a longitudinal axis. The dirt outlet may have a height in a direction of the longitudinal axis and the portion of the wall may have a height so as to extend along the height of the dirt outlet.

The portion of the wall may extend away from the dirt outlet along at least a portion of a length of the cyclone chamber.

The dirt outlet may be positioned adjacent the second opposed end of the dirt collection chamber and the passage may terminate prior to the first opposed end of the dirt collection chamber.

A portion of the wall facing the dirt outlet may extend inwardly towards the dirt outlet.

A portion of the wall facing the dirt outlet may extend convexly inwardly towards the dirt outlet.

A vacuum cleaner may comprise an air flow path extending from a dirty air inlet to a clean air outlet, the air flow path including a suction motor in a suction motor housing and may comprise the cyclone bin assembly. The portion of the wall may be configured to seat on a portion of the suction motor housing.

The vacuum cleaner may comprise an air flow path extending from a dirty air inlet to a clean air outlet. The air flow path may include a suction motor in a suction motor housing and the cyclone bin assembly. The first and second portions may be configured to be positioned on opposed sides of the suction motor.

The air inlet and the air outlet may be at the first opposed end of the cyclone chamber.

The cyclone chamber may comprise a sidewall extending between the first and second opposed ends and the dirt outlet may comprise a slot that is provided in the sidewall adjacent the second opposed end.

A portion of the sidewall may terminate prior to the second opposed end and defines a terminal end of the sidewall, the terminal end extending part way around the cyclone chamber.

The dirt outlet may have an angular extent around the cyclone chamber and a larger portion of the angular extent of the slot faces the first portion.

The cyclone chamber may have a direction of rotation and the first portion may be angularly positioned upstream of the second portion in the direction of rotation.

The cyclone chamber may have a longitudinal axis that is essentially horizontal.

The dirt outlet may be provided in a lower portion of the cyclone chamber and may have a portion that is positioned at an upper end of the dirt collection chamber.

The dirt outlet may have a portion that is positioned at an upper end of one of the first and second portions.

The dirt outlet may have a portion that is positioned at an upper end of the first portion.

The portion of the wall may be configured to produce an airstream travelling through the passage between the first and second portions that may have a velocity that is greater than a velocity of the airstream immediately upstream and downstream of the passage.

The cyclone chamber may have a direction of rotation and the first portion may be angularly positioned upstream of the second portion in the direction of rotation.

DRAWINGS

Reference is made in the detailed description to the accompanying drawings, in which.

DETAILED DESCRIPTION

Figure 1:
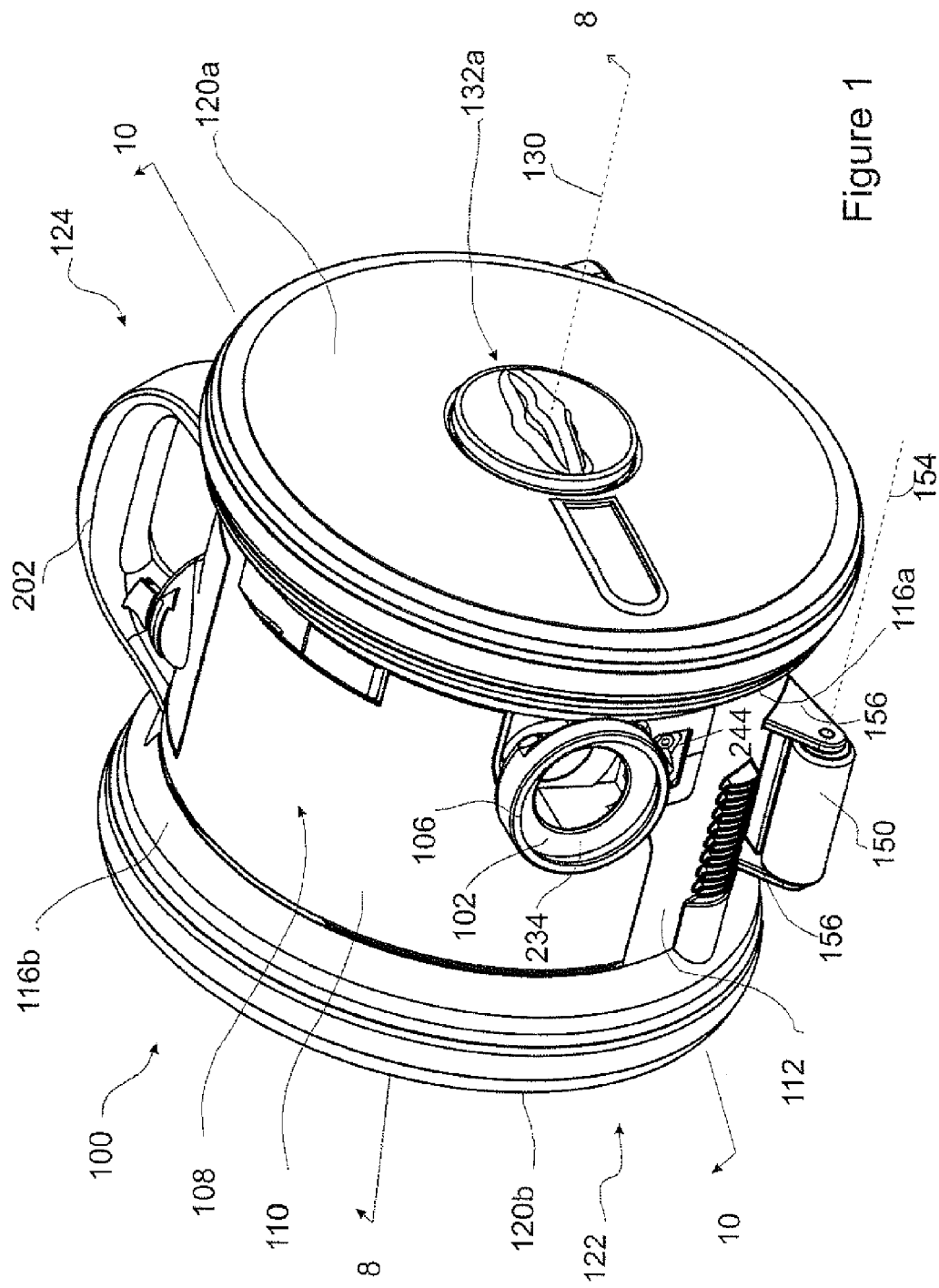
FIG. 1 is a front perspective view of an embodiment of a surface cleaning apparatus.
Figure 2:
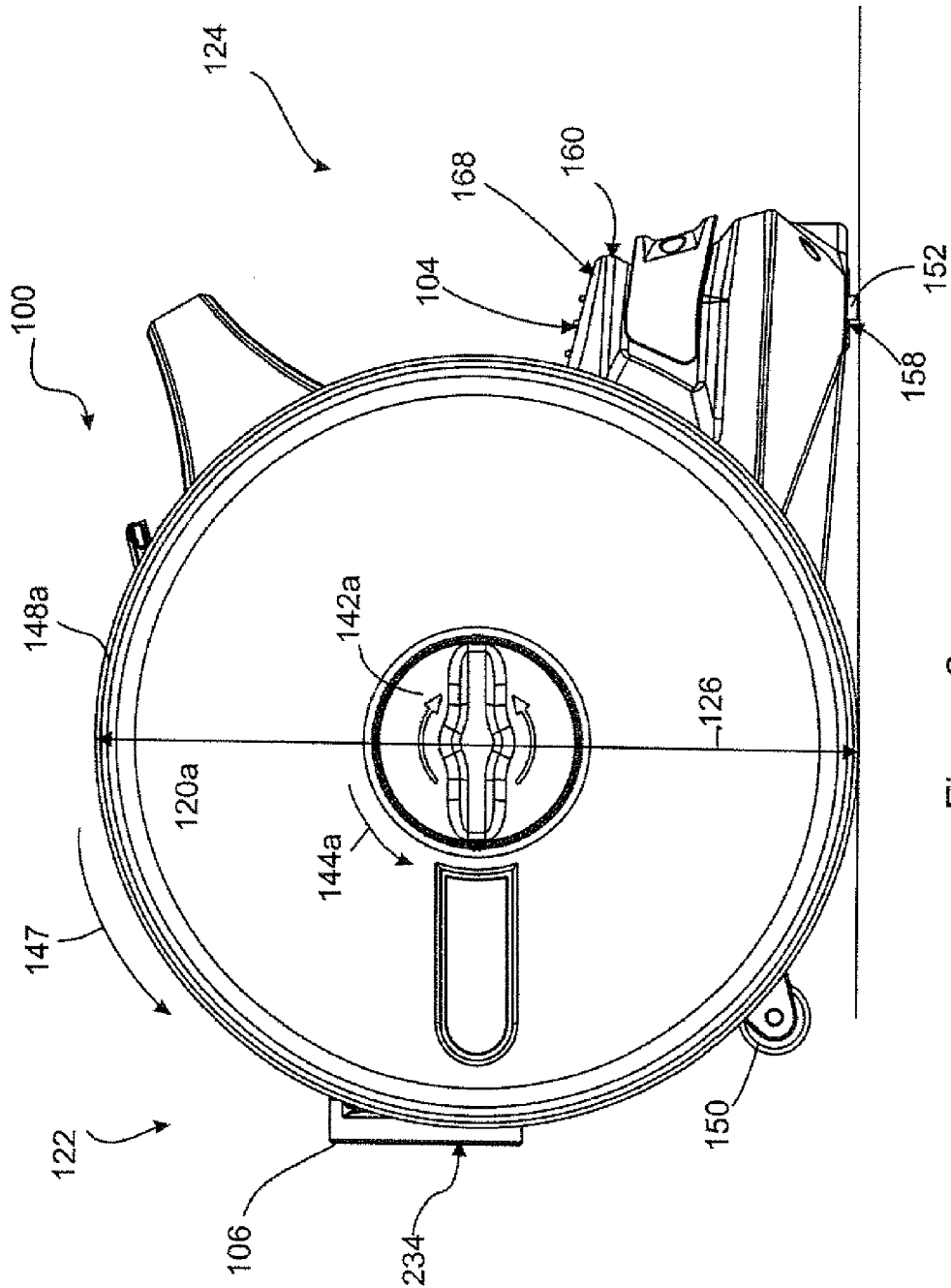
FIG. 2 is a left side elevation view of the surface cleaning apparatus of FIG. 1.
Figure 3:
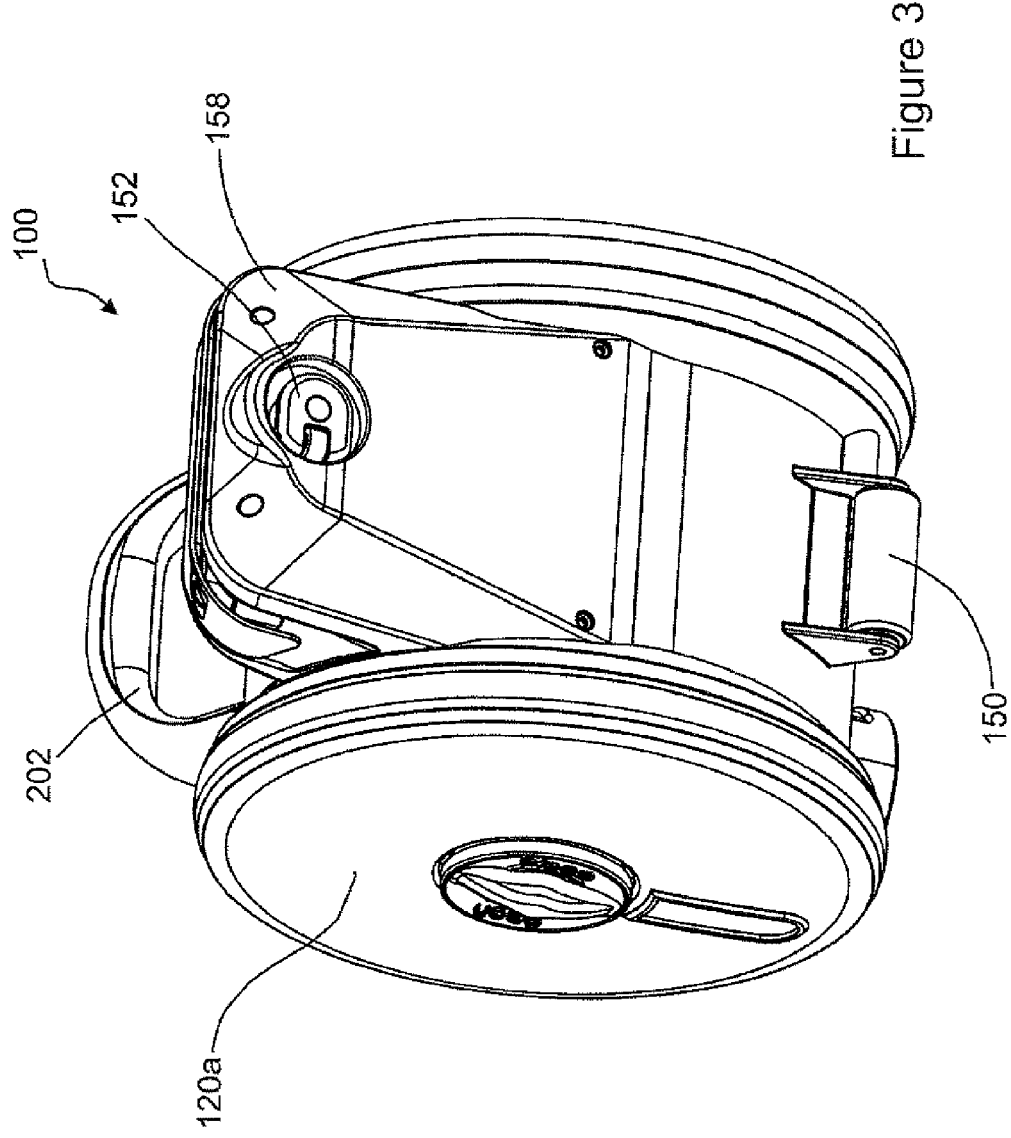
FIG. 3 is a rear lower perspective view of the surface cleaning apparatus of FIG. 1.

Referring to FIGS. 1 to 3, an embodiment of a surface cleaning apparatus 100 is shown. In the embodiment illustrated, the surface cleaning apparatus 100 is a canister vacuum cleaner.

General Overview

This detailed description discloses various features of surface cleaning apparatus 100. It will be appreciated that a particular embodiment may use one or more of these features.

In appropriate embodiments, the surface cleaning apparatus 100 may be another type of surface cleaning apparatus, including, for example, a hand operable surface cleaning apparatus, an upright vacuum cleaner, a stick vac, a wet-dry vacuum cleaner and a carpet extractor.

Referring still to FIG. 1, the surface cleaning apparatus 100 has a dirty air inlet 102, a clean air outlet 104 and an airflow passage extending therebetween. In the embodiment shown, the dirty air inlet 102 is the air inlet 234 of an optional suction hose connector 106 that can be connected to the downstream end of a flexible suction hose or other type of cleaning accessory tool, including, for example, a surface cleaning head, a wand and a nozzle. Any standard surface cleaning head may be provided on the upstream end of the flexible hose or wand. In some embodiments, a hose connector may not be used. Alternately, or in addition, the hose or wand may be connected directly to treatment member 108.

From the dirty air inlet 102, the airflow passage extends through an air treatment member 108 that can treat the air in a desired manner, including for example removing dirt particles and debris from the air. Preferably, as shown in the illustrated example, the air treatment member 108 comprises a cyclone bin assembly 110. Alternatively, or in addition, the air treatment member 108 can comprise a bag, a filter or other air treating means. In some embodiments, the air treatment member may be removably mounted to main body 112 or may be fixed in main body 112. In some embodiments, the cyclone bin assembly may be of any design or it may use one or more features of the cyclone bin assembly disclosed herein.

A suction motor 111 (FIG. 8) is preferably mounted within a main body 112 of the surface cleaning apparatus 100 and is in fluid communication with the cyclone bin assembly 110.

Figure 11:
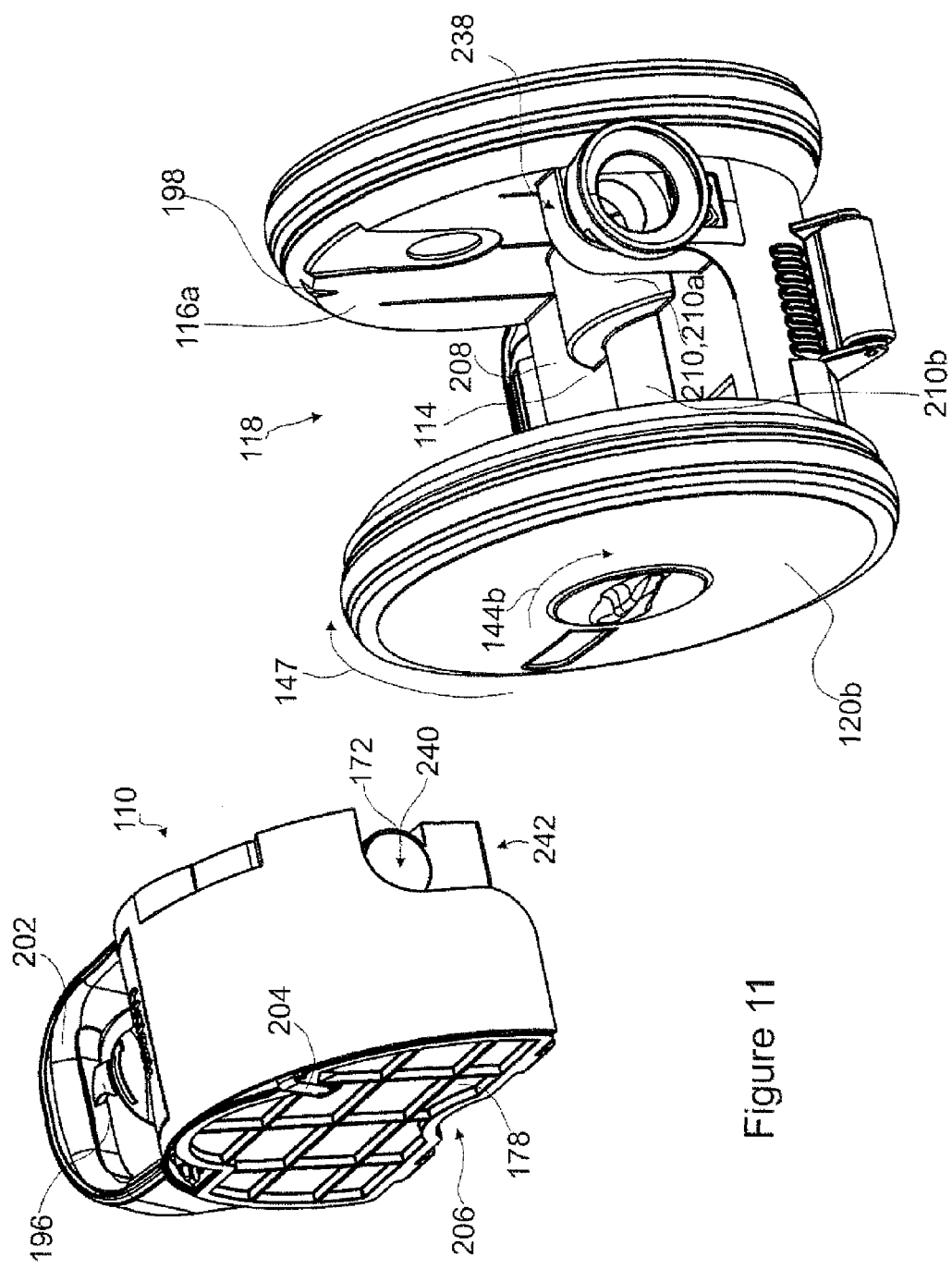
FIG. 11 is a perspective view of the surface cleaning apparatus of FIG. 1, with a cyclone bin assembly removed.
Figure 12:
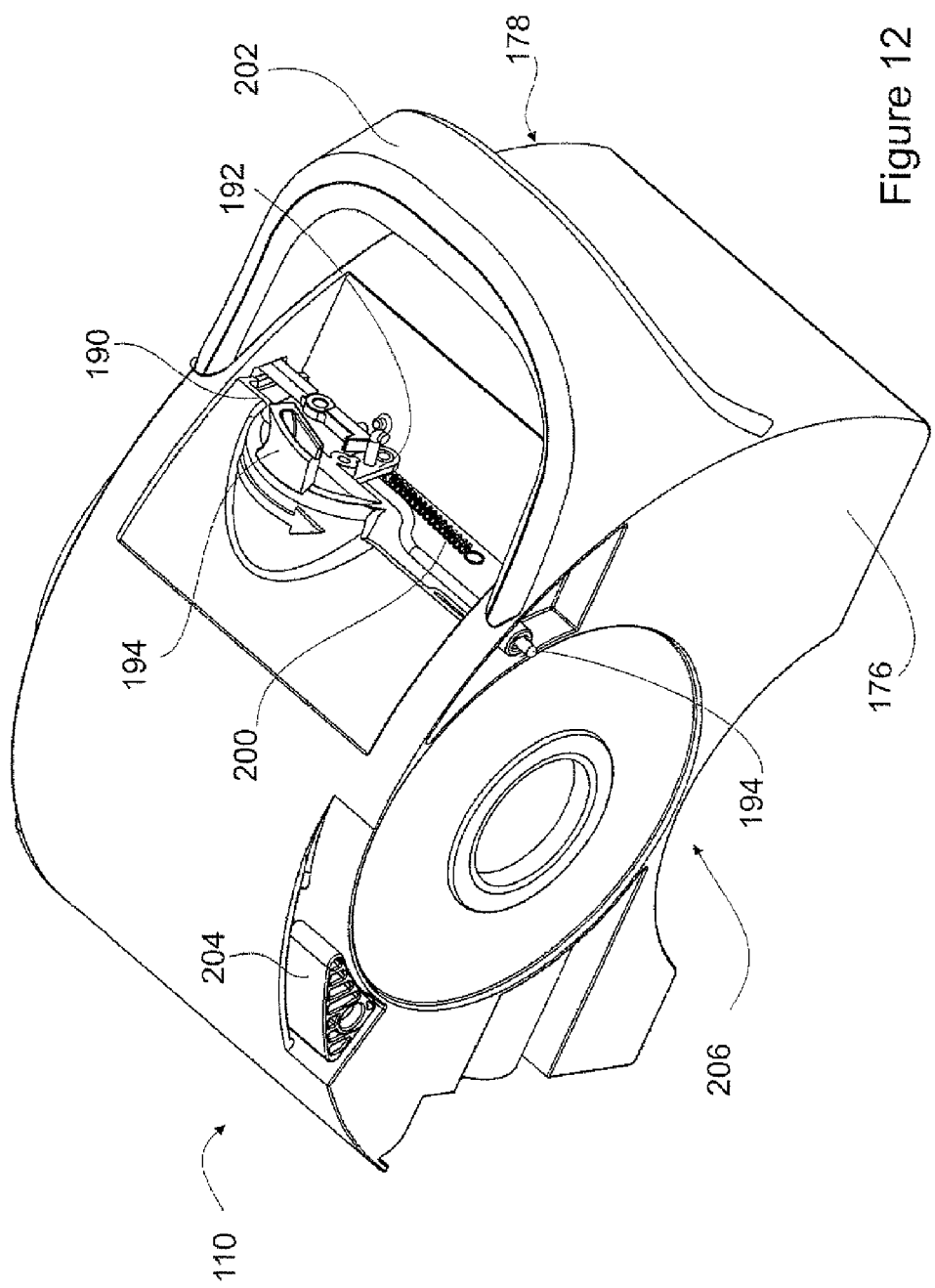
FIG. 12 is a top perspective view of the cyclone bin assembly of FIG. 11.

As exemplified in FIG. 11, the body 112 of the surface cleaning apparatus 100 preferably is a rollable, canister-type body that comprises a platform 114 and two opposing sidewalls 116a, 116b that cooperate to define a central cavity 118. The surface cleaning apparatus 100 also preferably comprises two main side wheels 120a, 120b, rotatably coupled to the sidewalls 116a and 116b, respectively.

The clean air outlet 104, which is in fluid communication with an outlet of the suction motor 111, is preferably provided in the body 112. In the illustrated example, the dirty air inlet 102 is preferably located toward the front 122 of the surface cleaning apparatus 100, and the clear air outlet is preferably located toward the rear 124.

Rotation Mount for the Main Side Wheels

Preferably, as shown in the illustrated example, the body sidewalls 116a,b are generally circular and cover substantially the entire side faces of the surface cleaning apparatus 100. One main side wheel 120a, 120b is coupled to the outer face of each body sidewall 116a and 116b, respectively. Optionally, the side wheels 120a, 120b may have a larger diameter 126 than the body sidewalls 116a,b and can completely cover the outer faces of the sidewalls 116a,b. Each side wheel 120a,b is rotatably supported, e.g., by a corresponding axle mount 128a, 128b, which extends from the body sidewalls 116a and 116b, respectively. The main side wheels 120a (FIGS. 6) and 120b (FIG. 7) are rotatable about a primary axis of rotation 130. In the illustrated example, the primary axis of rotation 130 passes through the cyclone bin assembly 110 (see for example FIG. 8).

Optionally, at least one of the side wheels 120a,b can be openable, and preferably detachable from the body 112. Referring to FIGS. 4-9, in the illustrated example both side wheels 120a and 120b are detachably coupled to their corresponding axle mounts 128a and 128b by axles comprising threaded hub assemblies 132a and 132b, respectively, and can be removed from the body 112. Removing the side wheels 120a, 120b from the body 112, or otherwise positioning them in an open configuration, may allow a user to access a variety of components located in compartments between the side wheels 120a and 120b and the corresponding sidewalls 116a and 116b, as explained in greater detail below.

For clarity, reference will now be made to FIG. 9, which is an enlarged view of hub assembly 132b, and it is understood that analogous features are provided on hub assembly 132a and can be referenced herein using the same references numbers having an "a" suffix. Hub assembly 132b provides a rotational mount for wheel 120b and may be of various designs.

As exemplified, hub assembly 132b comprises a threaded socket 134b and mating threaded lug 136b. The threaded inserts 138b provide a threaded central bores for receiving the mating threaded shafts 140b on the lugs 136b.

In the illustrated each threaded socket 134b comprises a threaded insert member 138b, that is positioned within a corresponding axle mount 128b, and preferably non-rotatably and non-removably mounted, in axle mount 128b. The threaded insert 138b may be non-rotatably fastened to the axle mount 128b, for example by using a screw or other fastener, a sliding locking fit, an adhesive and the like. Each lug 136b comprises a thread shaft 140b extending from a head 142b. The threaded shaft 140b has external threads for engaging the threaded bore of the threaded insert 138b.

Alternatively, instead of providing a separate thread insert member, the socket 134b can comprise integral threads formed on the inner surfaces of the axle mount 128b. Alternately the sidewalls may include a bearing or the like.

In the illustrated example, the heads 142a, 142b are configured to be engaged by a user. Each lug 136a, 136b is rotatable between a locked and an unlocked position relative to its insert 138a, 138b. In the unlocked position, the lugs 136a, 136b can be axially inserted and removed from the inserts 138a, 138b. Removing the lugs 136a, 136b from the inserts 138a, 138b can allow a user to remove the side wheels 120a and 120b retained by the lugs 136a and 136b, respectively. To re-attach the side wheels 120a, 120b, a user can position the side wheel 120a, 120b over the corresponding sidewall 116a, 116b, insert the lugs 136a, 136b into the treaded inserts 138a, 138b and then rotate the lugs 136a, 136b, in a locking direction 144a (FIG. 2), 144b (FIG. 11), into the locked position to retain the wheels 120a, 120b in their operating position.

In the illustrated example, the heads 142a and 142b are sized and shaped to be grasped by the bare fingers of a user. Configuring the heads 142a, 142b to be grasped by the bare fingers of a user may help facilitate the attachment and release of the lugs 136a, 136b from the threaded inserts 138a, 138b by hand, without requiring additional tools. Alternatively, or in addition to be graspable by bare fingers, the heads 136a, 136b can be configured to be engaged by a tool, including, for example, a screw driver, socket, allan key and wrench. When assembled in the manner shown in FIG. 8, both the lugs 136a, 136b and threaded inserts 138a, 138b remain fixed and do not rotate relative to the body 112 when the surface cleaning apparatus 100 is in use.

Referring again to FIG. 9, lug 136b comprises a wheel bearing surface 146b configured to rotatably support an inner edge 148b of a corresponding the side wheel 116b. Allowing rotation between the wheel bearing surface 146b and the inner edge 148b of the wheel 120b facilitates rotation of the side wheel 120b relative to the body 112. Optionally, the interface between the wheel bearing surface 146b and the inner edge 148b of the side wheel 120b can be lubricated or otherwise treated to help reduce friction at the interface may be provided. In some examples, a rotary bearing or other type of bearing apparatus may be used to support the side wheels 120a and 120b on the hub assemblies 132a and 132b. In the illustrated example, the wheel bearing surfaces 146 on the lug portions 132a, 132b are identical, and the inner edges 148 of the side wheels 120a, 120b are identical. Providing identical wheel bearing surfaces 146a,146b and inner edge surfaces 148a, 148b may allows the side wheels 120a, 120b to be interchangeable, such that each side wheel 120a, 120b can be used on either side of the surface cleaning apparatus 100.

Preferably, the friction between the wheel bearing surface 146b and the inner edge 148b of the side wheel 120b is sufficiently low to allow the side wheel 120b to rotate relative to the lug 136b without exerting a significant rotation torque on the lug 132b. However, in some circumstances, the side wheels 120a, 120b may exert a rotational torque on the lugs 136a, 136b. Optionally, the threads on the lugs 136a, 136b and inserts 138a, 138b can be configured so that the direction of forward rotation 147 of a side wheel, for example side wheel 120a in FIG. 2, coincides with the locking direction 144a of the corresponding lug, for example lug 138a. In this configuration, the locking direction 144a of the lug 136a can be opposite the locking direction 144b of lug 136b. Providing lugs 136a, 136b with threads configured to having opposing locking directions 144a, 144b can enable each lug 136a, 136b to have a locking direction 144a, 144b that coincides with, e.g., the forward direction of rotation of the side wheel 120a, 120b. Preferably, as shown in the illustrated example, the locking direction of lug 144a is counter-clockwise (as viewed in FIG. 2), and the locking direction of lug 144b is clockwise (as viewed in FIG. 11).

In this configuration, when the surface cleaning apparatus 100 is being pulled in a forward direction, rotational torque exerted by the side wheels 120a, 120b on the lugs 136a, 136b may drive the lugs 136a, 136b toward their locked positions. This may help reduce the chances of a lug 136a, 136b becoming unintentionally loosened or unscrewed by the rotation of the side wheels 120a, 120b.

Figure 4:
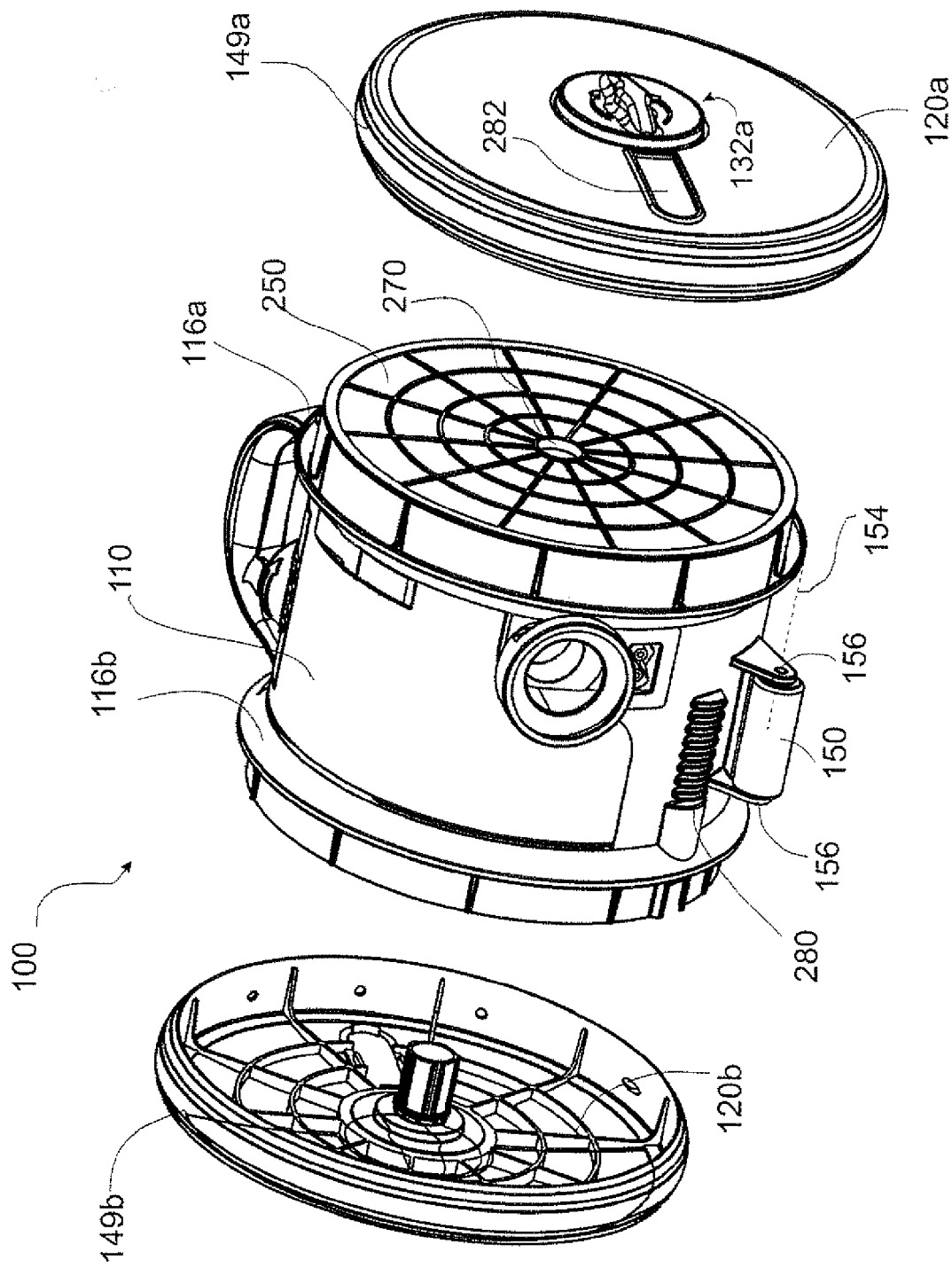
FIG. 4 is a partially exploded view of the surface cleaning apparatus of FIG. 1, with the side wheels exploded.
Figure 8:
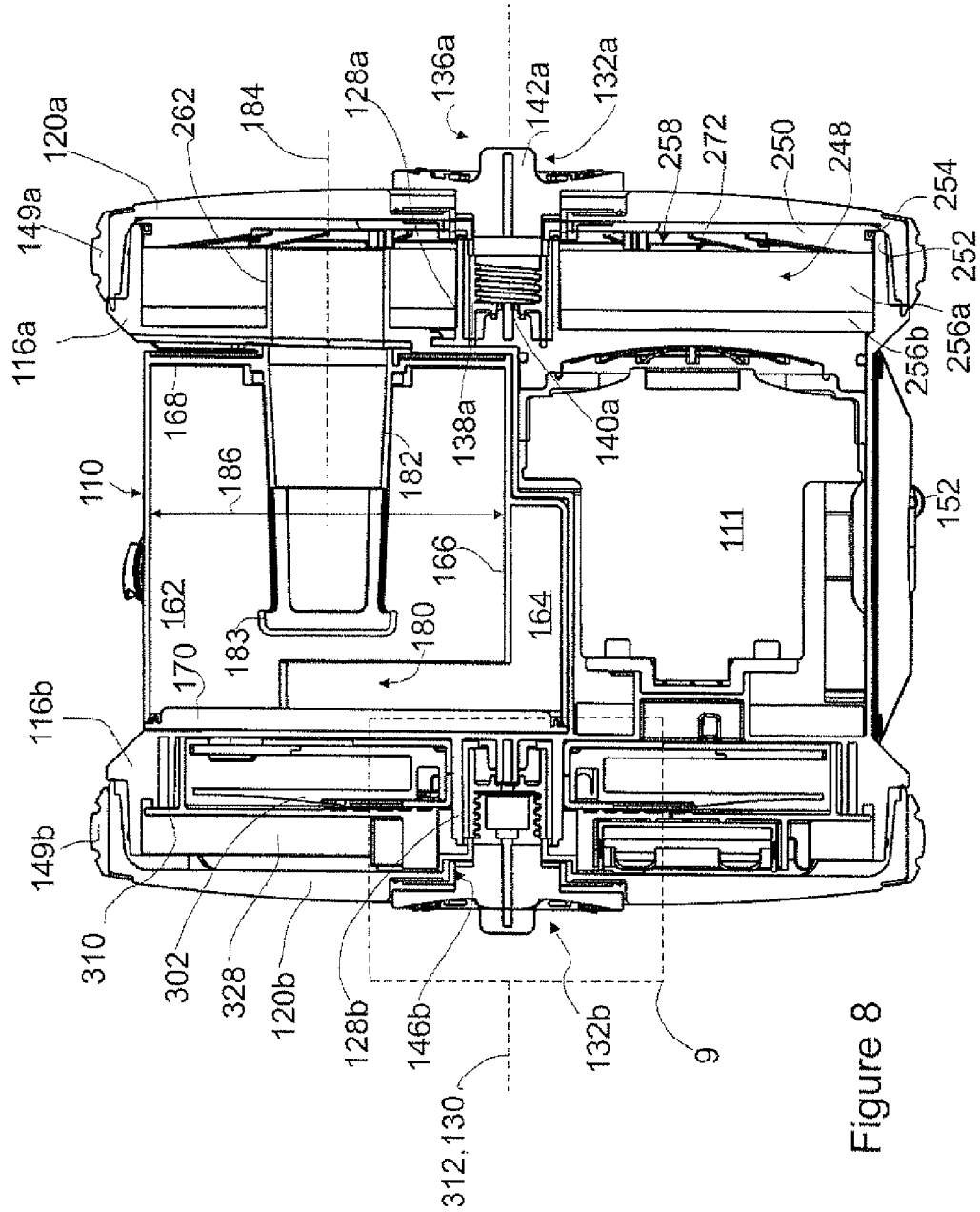
FIG. 8 is a section taken along line 8-8 in FIG. 1.

Referring to FIGS. 4 and 8, optionally, each wheel 120a, 120b may comprise a tire 149a, 149b extending around the perimeter of the wheel. The tires 149a, 149b can be formed from a different material than the wheels 120a, 120b. Optionally, the tire 149a, 149b can be formed from a material that is softer than the wheel material, for example rubber, which may help increase the traction of the wheels 120a, 120b.

Preferably, the main side wheels 120a, 120b are configured to carry a majority of the load of the surface cleaning apparatus 100, when the surface cleaning apparatus 100 is in use. In the example illustrated, the surface cleaning apparatus 100 may ride solely or primarily on the side wheels 120a, 120b when it is being pulled in a forward or backward direction by a user.

Stabilizer Wheels

Optionally, the surface cleaning apparatus 100 can comprise one or more stabilizer wheels, in addition to the side wheels 120a, 120b. Preferably, the stabilizer wheels are configured to help support the surface cleaning apparatus 100 in a generally horizontal position as exemplified in FIG. 2 when the surface cleaning apparatus 100 is at rest. Optionally, the stabilizer wheels can be configured to not contact the ground when the body 112 is horizontal, and contact the ground when the body 112 rotates forward, or backward, by a predetermined amount. Configuring the stabilizer wheels in this manner may help prevent the surface cleaning apparatus 100 from over-rotating in a forward or backward direction. Preferably, if front and rear stabilizer wheels are provided, then the stabilizer wheels are positioned such that only one will contact a horizontal floor surface at a time.

Referring to FIGS. 1-4, in the illustrated example, the surface cleaning apparatus 100 comprises a front stabilizer wheel 150 and a rear stabilizer wheel 152. The front stabilizer wheel is preferably a cylindrical, roller-type wheel mounted toward the front of the body 112 by a pair of mounting brackets 156. The front stabilizer wheel is rotatable about an axis 154 of rotation that is generally parallel to the primary axis of rotation 130 and is provided forward of the primary axis of rotation 130. Optionally, the front stabilizer wheel 150 can be located so that the axis of rotation 154 is outside the diameter 126 of the side wheels 120a, 120b.

When the surface cleaning apparatus 100 is in a horizontal configuration, for example when it is in use, the front stabilizer wheel 150 may be spaced above the floor (see FIG. 2). When the surface cleaning apparatus 100 pivots forward, the front stabilizer wheel 150 can contact the ground. With the front stabilizer wheel 150 on the ground, the surface cleaning apparatus 100 is supported in a generally stable rest position by three points of contact (the side wheels 120a, 120b and the front stabilizer wheel 150).

Preferably, as shown in the example illustrated, the rear stabilizer wheel 152 is a swivelable, caster-type wheel. The rear stabilizer wheel 152 may be swivelably mounted in a recess 158 on the underside of a post-motor filter housing 160 (see also FIG. 10), which extends from the rear of the body 112. The rear stabilizer wheel 152 is preferably mounted behind the primary axis of rotation 130. In the illustrated example, the rear stabilizer wheel 152 can be in rolling contact with the ground when the surface cleaning apparatus 100 is in the horizontal position. In this configuration, the rear stabilizer wheel 152 can help support the surface cleaning apparatus 100 when it is in use, and may help limit rearward rotation of the body 112.

Optionally, the front and rear stabilizer wheels 150, 152 can be configured so that only one of the stabilizer wheels 150, 152 can contact the ground at any given time when the vacuum cleaner is on a horizontal surface. This prevents both stabilizer wheels 150, 152 from simultaneously contacting the ground when the vacuum cleaner is used on a horizontal surface. If both stabilizer wheels contact the ground at the same time, this may interfere with the steering of the surface cleaning apparatus 100. In the example illustrated, the rear stabilizer wheel 152 is lifted out of contact with the ground when the front stabilizer wheel 150 is in contact with the ground, and vice versa.

Cyclone Bin Assembly

Referring to FIGS. 8, 10, 11, 13 and 14, in the illustrated example, cyclone bin assembly 110 includes a cyclone chamber 162 and a dirt collection chamber 164. The cyclone bin assembly 110 is detachably mounted in the cavity 118, laterally between the sidewalls 116a, 116b and side wheels 120a, 120b. Positioning the cyclone bin assembly 110 in the cavity 118, between the body sidewalls 116a, 116b may help protect the cyclone bin assembly 110 from side impacts, for example if the surface cleaning apparatus 100 contacts a piece of furniture or other obstacle. Preferably, the body sidewalls 116a, 116b have a larger cross-sectional area than the cyclone bin assembly 110. More preferably, the transverse faces of the cyclone bin assembly 110 are entirely covered by the body sidewalls 116a, 116b.

In the illustrated example, the cyclone chamber 162 is bounded by a sidewall 166, a first end wall 168 and a second end wall 170. A tangential air inlet 172 is provided in the sidewall of the cyclone chamber 162 and is in fluid communication with the dirty air inlet 102. Air flowing into the cyclone chamber 162 via the air inlet can circulate around the interior of the cyclone chamber 162 and dirt particles and other debris can become disentrained from the circulating air.

A slot 180 formed between the sidewall 166 and the second end wall 170 serves as a cyclone dirt outlet 180 (FIG. 8). Debris separated from the air flow in the cyclone chamber 162 can travel from the cyclone chamber 162, through the dirt outlet 180 to the dirt collection chamber 164.

Figure 13:
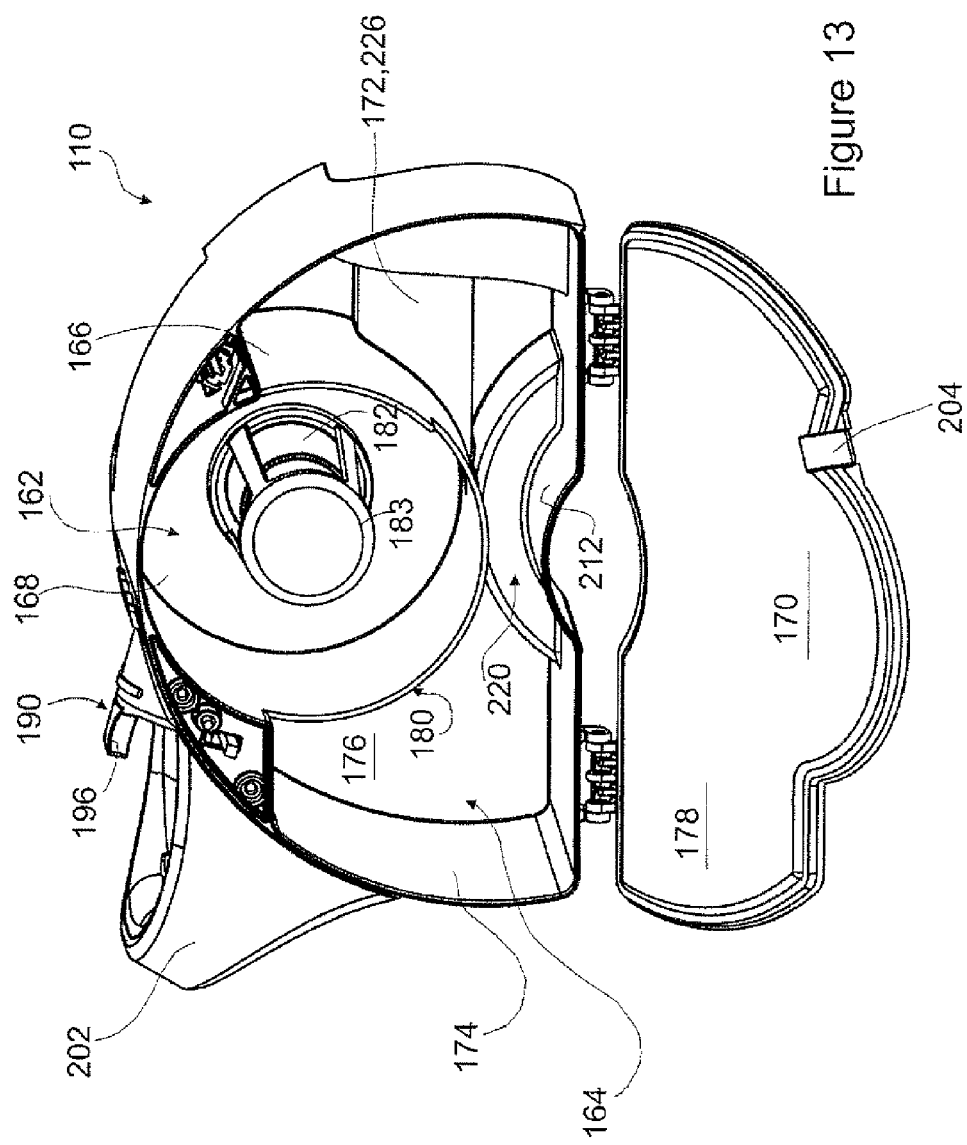
FIG. 13 is perspective view of the cyclone bin assembly of FIG. 12, with one end wall open.
Figure 14:
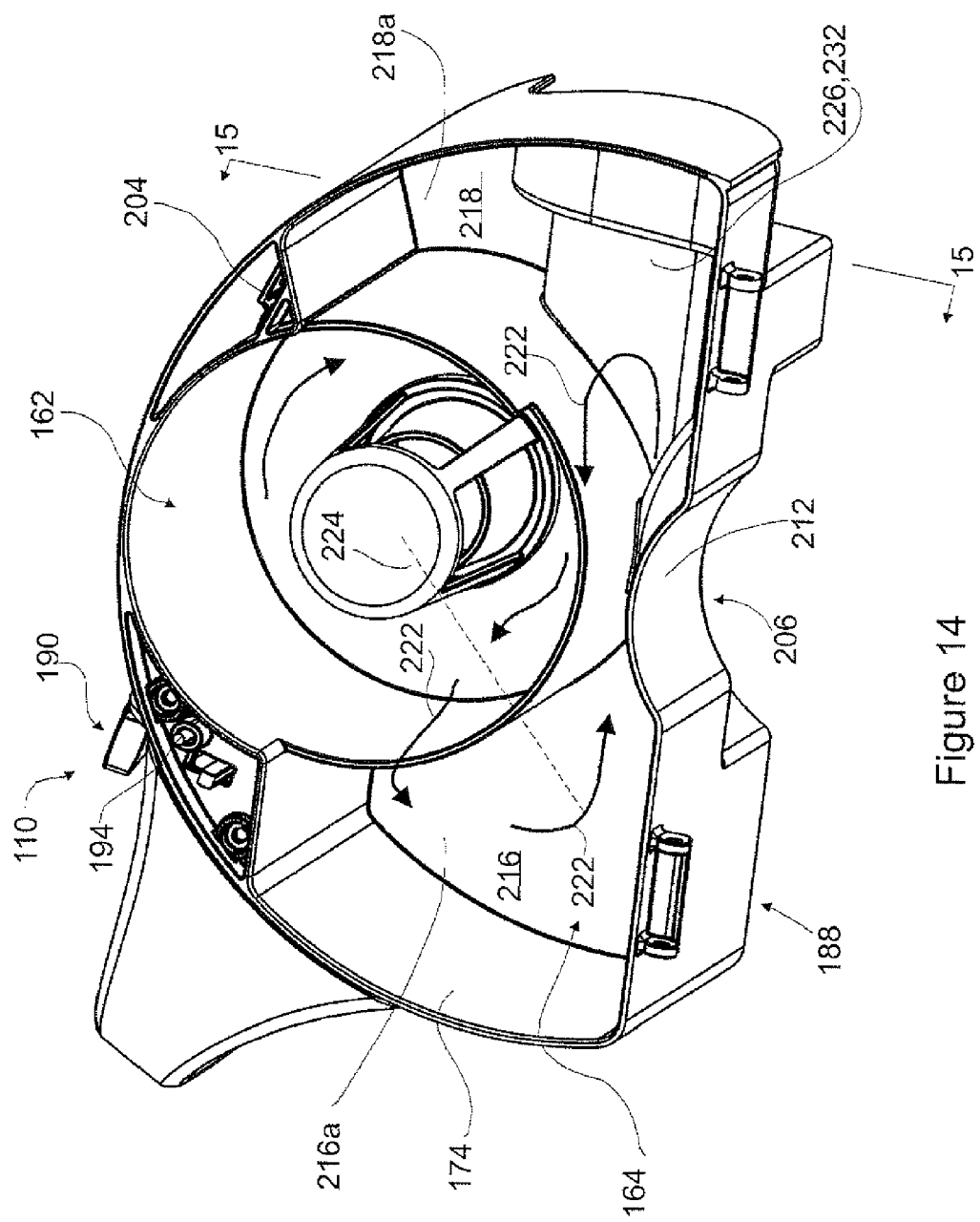
FIG. 14 is perspective view of the cyclone bin assembly of FIG. 13, with one end wall removed.

Air can exit the cyclone chamber 162 via an air outlet. In the illustrated example, the cyclone air outlet includes a vortex finder 182 (FIGS. 8, 13). Optionally, a removable screen 183 can be positioned over the vortex finder 182. The cyclone chamber 162 extends along a longitudinal cyclone axis 184. In the example illustrated, the longitudinal cyclone axis is aligned with the orientation of the vortex finder 182 and is generally transverse to the direction of movement of the surface cleaning apparatus 100. The cyclone chamber 162 has a generally circular cross sectional shape (taken in a plane perpendicular to the cyclone axis) and has a cyclone diameter 186.

The dirt collection chamber 164 comprises a sidewall 174, a first end wall 176 and an opposing second end wall 178. Preferably, as shown in the illustrated example, at least a portion of the dirt collection chamber sidewall 174 is integral with a portion of the cyclone chamber sidewall 166, and at least a portion of the first cyclone end wall 168 is integral with a portion of the first dirt collection chamber end wall 176.

A lower surface 188 of the cyclone bin assembly 110 is preferably configured to rest on the platform 114, and the first and second end walls 168, 170 of the cyclone bin assembly 110 may be shaped to engage the inner surfaces of the body sidewalls 116a, 116b, respectively. The upper portion of the cyclone bin assembly 110 (as viewed when installed in the cavity 118) can have a radius of curvature that generally corresponds to the radius of curvature of the body sidewalls 116a, 116b and the side wheels 120a, 120b. Matching the curvature of the cyclone bin assembly 110 with the curvature of the side wheels 120a, 120b may help facilitate mounting of the cyclone bin assembly 110 within the body 112, so that the walls of the cyclone bin assembly 110 do not extend radially beyond the body sidewalls 116a, 116b or main side wheels 120a, 120b.

Referring to FIG. 13, the second dirt collection chamber end wall 178 is preferably pivotally connected to the dirt collection chamber sidewall 174. The second dirt collection chamber end wall 178 can be opened to empty dirt and debris from the interior of the dirt collection chamber 164. Optionally, the cyclone chamber is openable concurrently with the dirt collection chamber. Accordingly, for example, the second cyclone end wall 170 is integral with and is openable with the second dirt collection chamber end wall 178. Opening the second cyclone end wall 170 can allow dirt and debris to be emptied from the cyclone chamber 162. The second dirt collection chamber sidewall 178 can be retained in the closed position by a releasable latch 204.

Optionally, the screen 183 and/or the vortex finder 182 can be removable from the cyclone chamber 162 and can be removed when the second dirt collection chamber end wall 178 is open.

Cyclone Assembly Bin Lock

Referring to FIGS. 11-14, a releasable bin locking mechanism 190 can be used to secure the cyclone bin assembly 110 within the cavity 118. Preferably, the bin locking mechanism 190 retains the cyclone bin assembly 110 within the cavity 118 by engaging at least one of the body sidewalls 116a, 116b, although the cyclone bin assembly may alternately, or in addition, be secured to the platform 114.

In the illustrated example, the bin locking mechanism 190 comprises a mechanical linkage comprising an actuating lever 192 pivotally connected to the cyclone bin assembly 110 and a pair of locking pins 194 movably connected to the actuating lever 192. A release member 196, that is configured to be engaged by a user, is connected to the actuating lever 192. Corresponding locking cavities 198 for engaging the locking pins 194 are provided in the body sidewalls 116a, 116b. In the illustrated example, the locking cavities 198 are shaped to slidingly receive the locking pins 194. Pivoting the actuating lever 192 causes the locking pins 194 to move between a locked position, in which the locking pins 194 extend into the locking cavities 198, and a retracted position in which the locking pins 194 are free from the locking cavities 198. Optionally, the bin locking mechanism 190 can include a biasing member, for example spring 200, for biasing the actuating lever 192 and locking pins 194 toward the locked position. It will be appreciated that a single locking pin 194 may be used. Also, other locking mechanisms may be utilized.

A handle 202 is provided on the top of the cyclone bin assembly 110. The handle 202 is configured to be grasped by a user. When the cyclone bin assembly 110 is mounted on the body 112, the handle 202 can be used to manipulate the surface cleaning apparatus 100. When the cyclone bin assembly 110 is removed from the body 112, the handle 202 can be used to carry the cyclone bin assembly 110, for example to position the cyclone bin assembly 110 above a waste receptacle for emptying. In the illustrated example, the handle 202 is connected to the dirt collection chamber sidewall 174.

Preferably, the handle 202 is in close proximity to the release member 196 of the bin locking mechanism 190. Placing the handle 202 and release member 196 in close proximity may allow a user to release the bin locking mechanism 190 and lift the cyclone bin assembly 110 out of the cavity 118 with a single hand. Accordingly, the actuator (e.g., release member 196) for the locking mechanism may be located such that the actuator may be operated simultaneously when a user grasps handle 202, thereby permitting one handed operation of the bin removal.

Configuration of the Dirt Collection Chamber

Referring to FIGS. 11-14, the dirt collection chamber sidewall 174 comprises a recess 206 that is shaped to receive a corresponding portion of the body 112.

In the illustrated example, the platform 114 comprises a generally planar bearing surface 208 for supporting the cyclone bin assembly 110. The platform 114 also comprises at least a portion of the suction motor housing 210 surrounding the suction motor 111. In this example, the recess 206 in the dirt collection chamber sidewall 174 is shaped to receive the portion of the motor housing 210 projecting above the planar bearing surface 208.

Preferably, at least a portion of the dirt collection chamber 164 surrounds at least a portion of the suction motor 111 and the suction motor housing 210. In this example, at least a portion of the dirt collection chamber 164 is positioned between the cyclone chamber 162 and the suction motor housing 210 (and the suction motor 111 therein). The shape of the recess 206 is selected to correspond to the shape of the suction motor housing 210. Preferably, the suction motor housing is shaped to conform with the shape of the suction motor. Accordingly, suction motor housing may have a first portion 210a that overlies the suction fan and a second portion 210b that overlies the motor section. Configuring the dirt collection chamber 164 to at least partially surround the suction motor housing 210 may help reduce the overall size of the surface cleaning apparatus 100, and/or may help increase the capacity of the dirt collection chamber 164. Alternately, or in addition, the dirt collection chamber 164 may surround at least a portion of the cyclone chamber 162.

Diverter Wall

Optionally, the dirt collection chamber 164 can include one or more internal diverter walls. The diverter walls may help separate the dirt collection chamber 164 into separate dirt collection portions. Preferably, the diverter wall can be positioned opposite the dirt outlet 180 of the cyclone chamber 162. Providing the diverter wall opposite the dirt outlet 180 may help divide the incoming dirt particles and other debris between the first and second dirt collection portions.

In the illustrated example, the dirt collection chamber 164 includes a diverter wall 212 that is positioned opposite the dirt outlet 180 and may extend along substantially the entire height 230 (FIG. 15) of the cyclone chamber 162. As exemplified in FIG. 15, diverter all 212 may comprise the portion of the recess that seats on the second portion 210b of motor housing 210 that overlies the motor section.

In this example, the diverter wall 212 is a curved portion of the dirt collection chamber sidewall 174, which comprises the inner surface of the recess 206 described above. In other embodiments, the diverter wall 212 can be a separate member or rib extending from the dirt collection chamber sidewall 174. Alternatively, the diverter wall 212 can be shorter than the cyclone chamber 162. Preferably, the diverter wall 212 overlies at least a portion of the dirt outlet 180. In other embodiments, diverter wall 212 may extend all the way to end wall 176 or may terminate prior thereto and preferably at a location spaced from dirt outlet 180 towards end wall 176.

The diverter wall 212 defines a first dirt collection portion 216 on a first side of the diverter wall 212, and a second dirt collection 218 portion on an opposing second side of the diverter wall 212. In the illustrated example the diverter wall 212 does not extend all the way to cyclone sidewall 166 and the first and second dirt collection portions 216, 218 are not isolated from each other. In this configuration, a relatively narrow throttling passage 220 is defined between the diverter wall 212 and the cyclone sidewall 166.

In use, dirty air from the cyclone chamber 162 can exit the dirt outlet 180 and flow into the dirt collection chamber 164, as illustrated using arrows 222. The dirty air flowing through the dirt collection chamber 164 can carry entrained fine dirt particles, and other debris. The passage 220 is configured to allow dirty air, containing dirt particles and other debris to move between the first and second dirt collection portions 216, 218.

Preferably, the dirt outlet 180 is asymmetrically positioned relative to the first and second dirt collection portions 216, 218. That is, the dirt outlet 180 is configured so that the centre of the dirt outlet 180, represented by radially oriented axis 224, is located within dirt collection portion 216. In this configuration, the centre of the dirt outlet 180 is not aligned with the diverter wall 212. Configuring the dirt outlet 180 in this manner may help direct dirty air exiting the dirt outlet 180 toward dirt collection portion 216. Alternatively, the dirt outlet 180 can be configured so that is symmetrically positioned relative to the dirt collection portions 216, 218.

In operation, preferably, the air exits the dirt air outlet 180 and enters first portion 216. The air travels to or towards the distal part 216a and then turns to return through first part 216 towards passage 220. Some of the entrained dirt will be disentrained as the air changes direction in part 216. Passage 220 is preferably narrower than the portion of the dirt chamber upstream thereof. Accordingly, this will cause an increase in the velocity of the air travelling through passage 220 to second portion 218. In particular, as the dirty air moves from the relatively large volume of dirt collection portion 216 to the relatively narrow passage 220, the velocity of the air, and the fine particles entrained therein, may increase. The air travels to or towards the distal part 218a and then turns to return through dirt outlet 180 into the cyclone chamber. Some of the entrained dirt will be disentrained as the air changes direction in part 218. Further, when the dirty air flow exits the passage 220 and enters the relatively larger volume of dirt collection portion 218, the velocity of the dirty air may decrease, which may help disentrain the fine dirt particles traveling with the dirty air flow. Accordingly, passage 220 may be used to increase the velocity of the air stream and permit finer dirt to be deposited in second portion 218. Passing over by the divider wall 212 may also create eddy currents or other types of air flow disruptions, which may also help facilitate fine particle disentrainment. From dirt collection portion 218, the air can re-enter the cyclone chamber 162 through the dirt outlet 180 and exit via the vortex finder 182.

Optionally, instead of having a curved, convex shape, the diverter wall 212 can have another cross-sectional shape including, for example an angled or triangular cross-section and a rectangular cross-section. Any shape which reduces the width of passage 220 may be used (i.e., a portion of the wall facing the dirt outlet extends inwardly towards the dirt outlet 180).

Secondary Divider

Optionally, the dirt collection chamber 164 can comprise a secondary divider in a dirt collection portion. In the example illustrated, the secondary divider comprises a secondary divider ridge 226 extending inwardly from the end wall opposite the dirt outlet 180. In the example illustrated, the secondary divider ridge 226 extends from the second end wall 178 and preferably terminates prior to the first end wall 176, which also comprises the clean air outlet of the cyclone chamber 162. The secondary divider ridge 226 extends from the cyclone chamber sidewall 174 to the dirt collection chamber sidewall 166.

Providing a secondary divider ridge 226 in the dirt collection portion 218 may help direct air flow toward the dirt outlet 180, as illustrated by arrows 222. The secondary divider ridge 226 may also help create additional eddy currents and/or other flow disruptions that may help facilitate the disentrainment of fine dirt particles from the air flow 222. Directing the air flow toward the dirt outlet 180 may help create a relatively calm region, having relatively low air flow velocity, downstream from the secondary divider ridge 226 towards second end wall 176, in which fine dirt particles can accumulate. Providing a relatively calm region may help reduce re-entrainment of the fine particles that settle in the calm region into the air flow re-entering the dirt outlet 180. Accordingly, divider wall 226 may create a wind shield thereby inhibiting the reentrainment of fine dirt that has settled in second portion 218.

Figure 15:
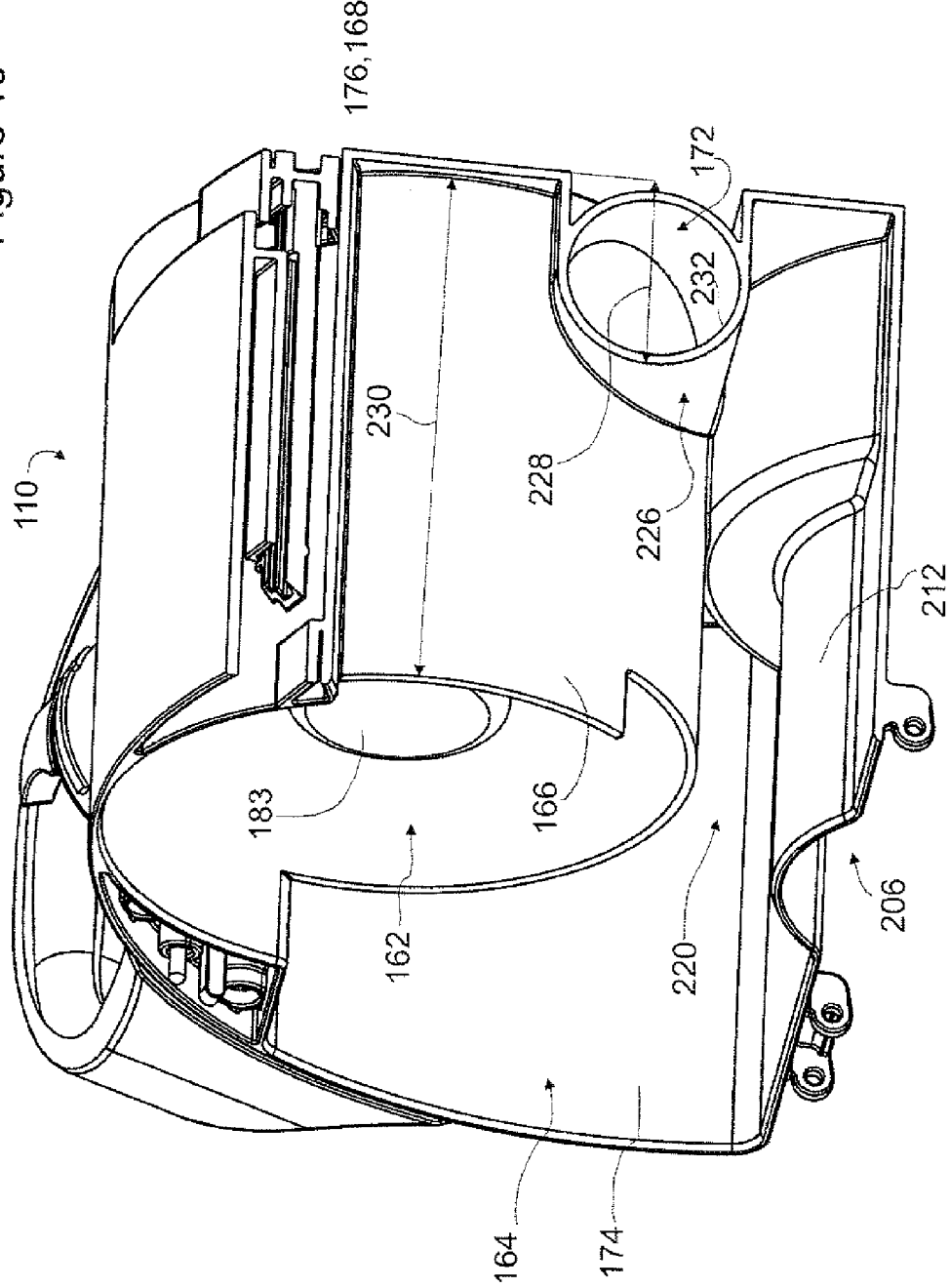
FIG. 15 is a section view taken along line 15-15 in FIG. 14.

Referring to FIG. 15, the height 228 of the secondary diverting ridge (the distance it extends inwardly from lower surface 188) can be between about 5% and about 95% of the height 230 of the cyclone chamber 162. Preferably, the height 228 of the secondary diverting ridge 226 is less than about 66% of the height of the cyclone 230, and more preferably is approximately 30% of the cyclone height 230. Preferably, the secondary dividing ridge 226 does not extend into the dirt outlet 180.

In the example illustrated, the secondary diverting ridge 226 comprises a portion of sidewall 232 of the tangential air inlet 172. Alternatively, the secondary diverting ridge 226 can be a separate member extending from the second end wall 178, and need not comprise the tangential air inlet 172. While illustrated as having a curved, convex cross-sectional shape, the secondary diverting ridge 226 can have any other suitable cross-sectional shape, including, for example a triangular cross-section and a rectangular cross-section.

While the example illustrated is a horizontal or transverse cyclone configuration, the diverter wall 212, secondary dividing ridge 226 and dirt outlet 180 alignment features described above can also be used, individually or in combination, in a vertically oriented cyclone bin assembly 110.

Suction Hose Connector

Figure 10:
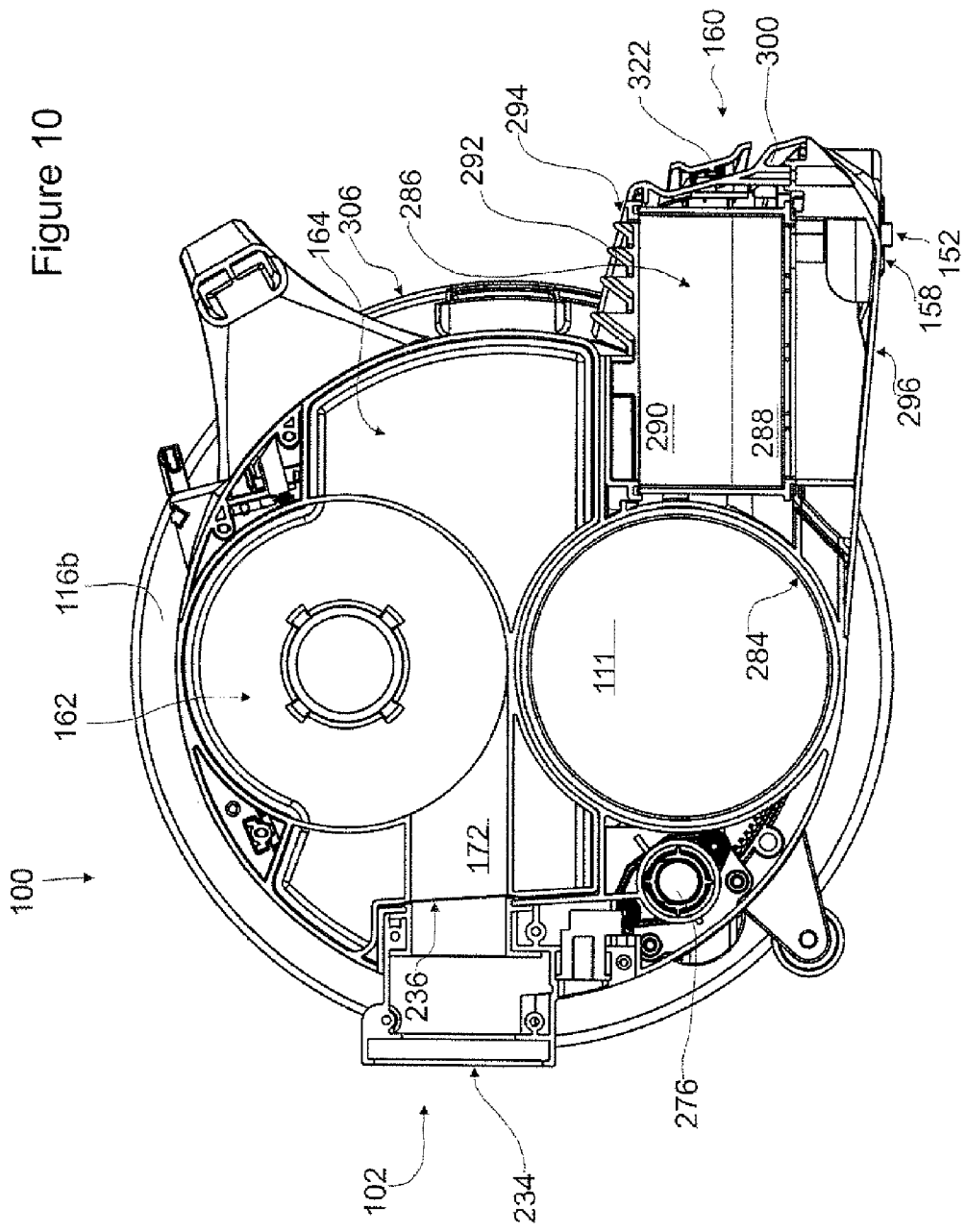
FIG. 10 is a section taken along line 10-10 in FIG. 1.

Referring to FIGS. 10 and 11, in the illustrated example, the suction hose connector 106 is connected to the body 112, and remains connected to the body 112 when the cyclone bin assembly 110 is removed. The suction hose connector 106 comprises an air inlet 234 that is connectable to the suction hose, and an opposing air outlet 236. A throat portion 238 of the suction hose connector 106 extends between the air inlet 234 and air outlet 236. Coupling the suction hose connector 106 to the body 112 may help facilitate the removal of the cyclone bin assembly 110 (for example to empty the dirt collection chamber 164) while leaving a suction hose connected to the body 112, via the suction hose connector 106.

The air outlet 236 is configured to connect to the tangential air inlet 172 of the cyclone chamber 162. In the illustrated example, a sealing face 240 on the tangential air inlet 172 is shaped to match the shape of the air outlet 236 of the suction hose connector 106. Optionally, a gasket, or other type of sealing member, can be provided at the interface between the sealing face 240 and the air outlet 236.

The air outlet 236 of the suction hose connector 106 and the sealing face 240 of the tangential air inlet 172 are configured so that the sealing face 240 can slide relative to the air outlet 236 (vertically in the illustrated example) as the cyclone bin assembly 110 is being placed on, or lifted off of the platform 114. Lowering the cyclone bin assembly 110 onto the platform 114 can slide the sealing face 240 into a sealing position relative to the air outlet 236.

Preferably, as exemplified, the sealing face 240 (and preferably part or all of the hose connector) is recessed within the cyclone bin assembly 110. In the illustrated example, the cyclone bin assembly 110 includes a notch 242 configured to receive the throat portion of the suction hose connector 106 when the cyclone bin assembly 110 is placed on the platform. With the cyclone bin assembly 110 on the platform, at least a portion of the throat 238 and the air outlet 236 are nested within cyclone bin assembly 110. Nesting at least a portion of the suction hose connector 106 within the cyclone bin assembly 110 may also help reduce the overall length of the surface cleaning apparatus 100.

Optionally, the suction hose connector 106 can serve as an alignment member to help guide the cyclone bin assembly 110 into a desired orientation when bin assembly 110 is remounted on platform 114. Alternatively, in other embodiments the suction hose connector 106 may be fixedly connected to the cyclone bin assembly 110, and may be removable with the cyclone bin assembly 110.

Referring to FIG. 1, an electrical power connector 244 is provided adjacent the suction hose connector 106. The electrical power connector 244 can be configured to receive a mating power coupling and may provide power to a cleaning tool, including, for example a surface cleaning head with a powered rotating brush.

Filter Chamber, Seal Plate and Foam Structure

Referring again to FIGS. 4, 5, 6 and 8, air exiting the cyclone chamber 162 flows to a suction motor inlet 246 via a filter chamber 248. The filter chamber 248 is provided downstream from the cyclone air outlet. In the illustrated example, the filter chamber 248 comprises a recessed chamber in the body sidewall 116a that is enclosed by an seal plate 250, that is preferably openable. A sealing gasket 254 or other means of creating an air tight compartment, is preferably provided at the interface between an annular rim 252 of the sidewall 116a and the seal plate 250 to help provide an air-tight filter chamber 248. Preferably, as illustrated, the filter chamber 248 extends over substantially the entire sidewall 116a and overlies substantially all of the transverse cross sectional area of cyclone chamber 162, dirt collection chamber 164 and suction motor 111.

A pre-motor filter 256 is provided in the filter chamber 248 to filter the air before it enters the suction motor inlet. Preferably, as illustrated, the pre-motor filter 256 is sized to cover substantially the entire transverse area of the filter chamber 248, and overlie substantially all of the transverse cross sectional area of the cyclone chamber 162, dirt collection chamber 164 and suction motor 111. Preferably, as illustrated, the pre-motor filter 256 comprises first and second pre-motor filters 256a, 256b. The filter chamber 248 comprises an air inlet chamber 258 on the upstream side 272 of the pre-motor filter 256, and an air outlet chamber 260 on the opposing downstream side of the pre-motor filter 256. Air can travel from the air inlet chamber 258 to the air outlet chamber 260 by flowing through the pre-motor filter 256.

Preferably, the upstream side of the pre-motor filter is the outward facing face of the pre-motor filter. Accordingly, the air inlet chamber 258 may be fluidly connected to the vortex finder 182 by an inlet conduit 262 that extends through a first aperture 264 in the pre-motor filter 256. The air outlet chamber 260 is in fluid communication with the inlet 246 of the suction motor 111. The pre-motor filter 256 may be supported by a plurality of support ribs 266 extending from the sidewall 116a into the air outlet chamber 260. Cutouts can be provided in the ribs 266 to allow air to circulate within the air outlet chamber 266 and flow toward the suction motor inlet 246.

Figure 5:
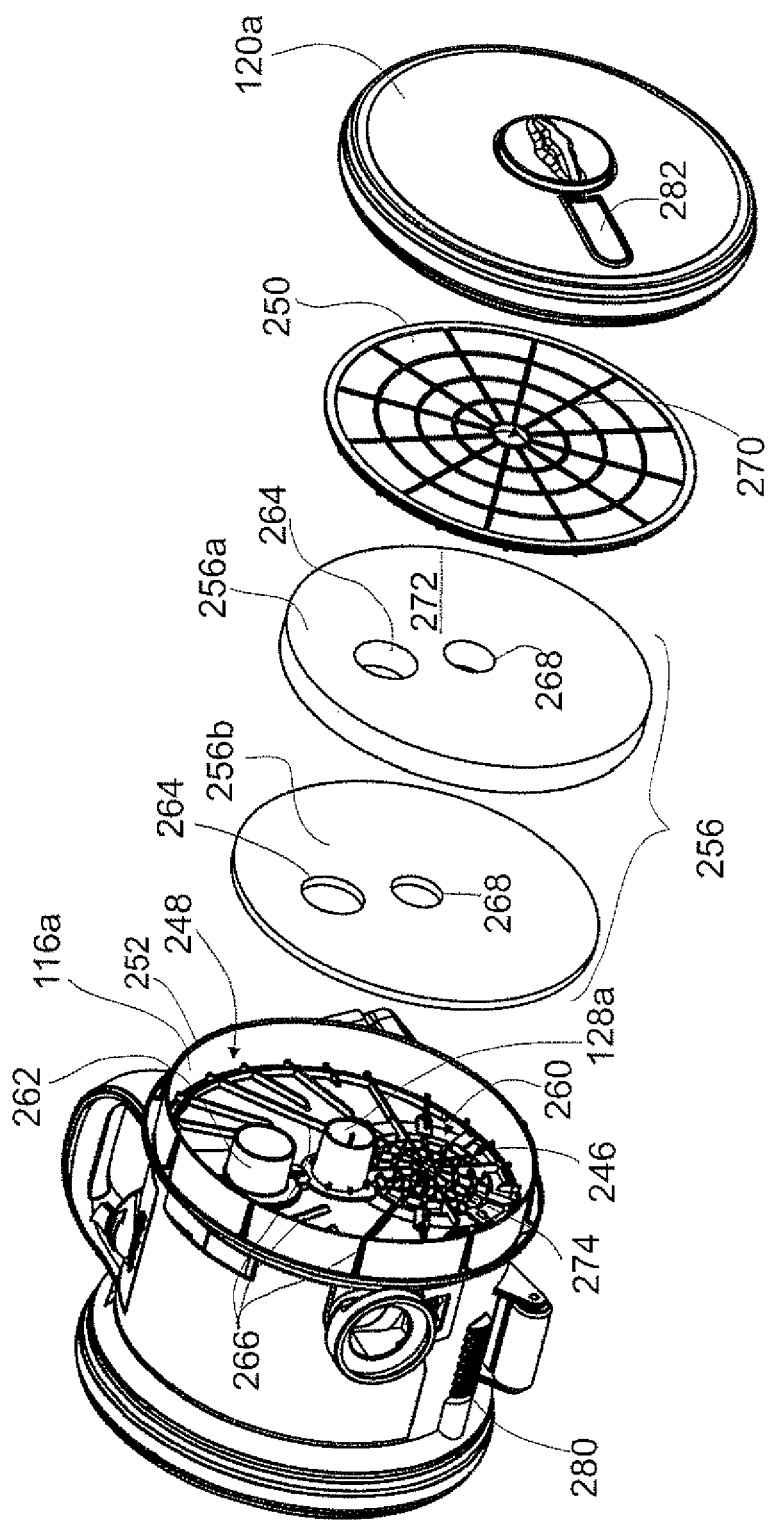
FIG. 5 is a partially exploded view of the surface cleaning apparatus of FIG. 1, with a side wheel, seal plate and pre-motor filter exploded.

In the illustrated example, the axle mount 128a for supporting the side wheel 120a is provided on the main body 12 and accordingly extends through the air filter chamber 248, a second aperture 268 in the pre-motor filter 256 and through an axle mount aperture 270 in the seal plate 250 (FIG. 5). The axle mount aperture 270 in the seal plate 250 is configured to provide an air-tight seal against the axle mount 128a. Optionally, a sealing gasket or the like can be provided at the interface between the seal plate 250 and the axle mount 128a. In this configuration the pre-motor filter 256 surrounds the axle mount 128a.

In the illustrated example, the seal plate 250 is removable, when the side wheel 120a is moved to an open position or detached, to allow a user to access the pre-motor filter 256. Alternatively, instead of being removable, the seal plate 250 can be movably attached to the body 112, for example pivotally connected to the sidewall 116a, such that the seal plate 250 can be opened without being completely detached from the body 112.

Preferably, the seal plate 250 is transparent, or at least partially transparent. Providing a transparent seal plate 250 may help facilitate visual inspection of the upstream side 272 of the pre-motor filter 256 while the seal plate 250 is in place. When the seal plate 250 is removed, the pre-motor filter 256 may be removed, for example for cleaning or replacement.

Openable Suction Motor Housing

Figure 6:
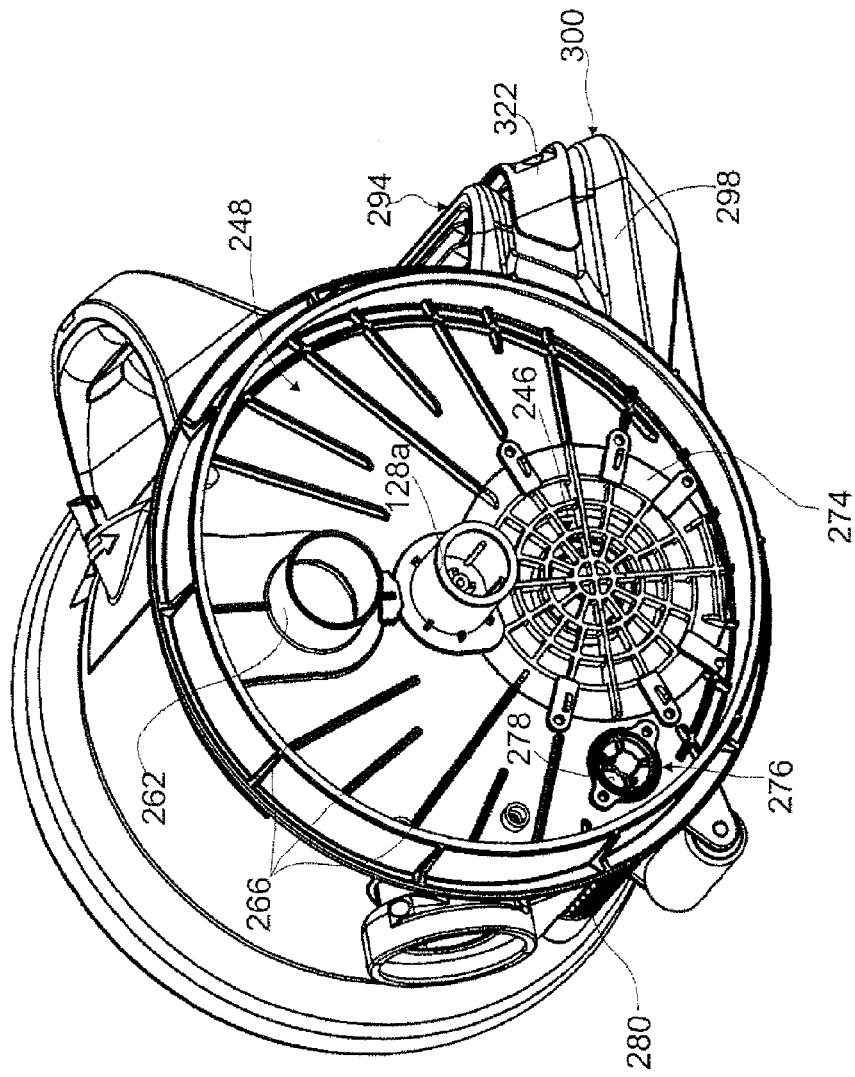
FIG. 6 is a side view of the surface cleaning apparatus of FIG. 1, with a side wheel, cover plate and pre-motor filter removed.

Referring to FIG. 6, optionally a portion of the suction motor housing 210 can be removably connected to the body 112. Preferably, the removable portion 274 of the suction motor housing 210 comprises the suction motor air inlet 246. More preferably, the removable portion 274 of the suction motor housing is large enough to allow access to and/or removal of the suction motor 111 from the body 112. In the illustrated example, the removable portion 274 of the suction motor housing 210, and optionally the suction motor 111, are accessible through the air filter chamber 248 and can be accessed when the seal plate 250 and pre-motor filter 256 are removed. Removable portion 274 may comprise an air intake grill and may be secured to the main body 12 by any means, such as screws or the like.

Bleed Valve

A bleed valve 276 is optionally provided to supply clean air to the suction motor inlet. In the illustrated example a bleed valve air outlet 278 is in fluid communication with the air outlet chamber 260 and can introduce clean air into the air outlet chamber 260 downstream from the pre-motor filter 256. Air introduced by the bleed valve 276 can flow through the optional cutouts in the supporting ribs 266, as described above. The bleed valve 276 may be a pressure sensitive valve that is opened when there is a blockage in the air flow path upstream from the suction motor 111. In the illustrated example, the bleed valve 276 is parallel with the suction motor 111. A bleed valve inlet 280 is provided toward the front of the body 112.

Filter Window in the Side Wheel

Preferably, the side wheel 120a covering the seal plate 250 includes at least one transparent region 282. Providing a transparent region 282 in the side wheel 120a may allow a user to visually inspect the upstream side 272 pre-motor filter 256 while the side wheel 120a is in place. In the illustrated example, the side wheel 120a includes a transparent window 282. The transparent window 282 can be sized so that a user can view a desired amount of the pre-motor filter 256 through the window. In the illustrated example, the window 282 is oriented in a generally radial orientation, and extends from the hub 132a to the peripheral edge of the side wheel 120a. Providing a radially oriented window 282 may allow a user to inspect a relatively large portion of the surface of the pre-motor filter 256 when the side wheel 120a is rotated relative to the body 112. Alternatively, instead of being configured in a radial orientation, the window 282 can be configured in an annular configuration (optionally concentrically aligned with the side wheel 120a) or other suitable configuration. Optionally, the side wheel 120a can include more than one window 282.

It will be appreciated that a filter chamber 248 may be provided alternately, or in addition, for a post motor filter.

Post Motor Filter Housing

Referring to FIGS. 6 and 10, from the suction motor inlet 246, the air is drawn through the suction motor 111 and ejected via a suction motor outlet 284 and into a post-motor filter chamber 286, within the post-motor filter housing 160. The post-motor filter chamber 248 contains an air inlet chamber 288 and an optional post-motor filter 290, including, for example a HEPA filter. In the illustrated example, the post-motor filter chamber 286 also comprises the clean air outlet 104, on the downstream side of the post-motor filter 290. A grill 292 can be used to cover the clear air outlet 104.

The post-motor filter chamber 286 can extend into the body 112 of the surface cleaning apparatus 100. In the illustrated example, a portion of post-motor filter chamber 286 is positioned transversely between the body sidewalls 116a, 116b and the side wheels 120a, 120b. Preferably, at least a portion of the post-motor filter 290 is positioned between the sidewalls 116a, 116b and within the diameter 126 of the side wheels 120a, 120b. Configuring the post-motor filter chamber 286 to extend between the sidewalls 116*a,* 116*b* and inside the diameter 126 of side wheels 120*a,* 120*b* may help reduce the overall length of the surface cleaning apparatus 100, as opposed to providing the entirety of the post-motor filter chamber 286 outside the diameter 126 of the side wheels 120*a,* 120*b.*

In the example illustrated, an exposed upper wall 294 of the post-motor filter housing 160 has a smaller surface area than the opposing lower wall 296. Preferably, the lower wall 296 or the end wall 300 may be openable to allow access to the post-motor filter 290, for example for inspection and replacement. In the illustrated example, the lower wall 296 is detachable from the post-motor filter housing sidewall 298 to allow access to the post-motor filter 290. A sealing gasket can be provided at the interface between the lower wall and the sidewall to help seal the post-motor filter chamber 248. Providing a removable lower wall 296 or end wall 300 may help facilitate removal of a post-motor filter 290 that has a larger area than the exposed upper wall 294, particularly if the post-motor filter 290 is rigid (for example a HEPA filter cartridge). Optionally, instead of being removable, the lower wall 296 can include an openable door to allow access to the post-motor filter 290.

Alternatively, the upper wall 194, sidewall 298 and/or end wall 300 of the post-motor filter housing can be openable to allow access to the post-motor filter 290.

In the example illustrated, the post-motor filter housing 160 is positioned at the rear of the surface cleaning apparatus 100. Alternatively, the post-motor filter housing 160 can be positioned toward the front of the surface cleaning apparatus 100, or at another suitable location on the body 112.

Cord Wind Spool

Referring to FIGS. 7-10, optionally, the surface cleaning apparatus 100 can comprise an internal electrical cord winding apparatus. In the illustrated example, the electrical cord winding apparatus is preferably a powered cord winder apparatus that includes a cord wrap spool 302 and a cord wrap motor 304. An electrical cord that is wrapped around the spool 302 can be drawn through a cord aperture 306 in the body 112 (FIG. 10). Optionally, the cord aperture 306 can include rollers or other guide members to help guide the cord through the aperture 306.

Figure 7:
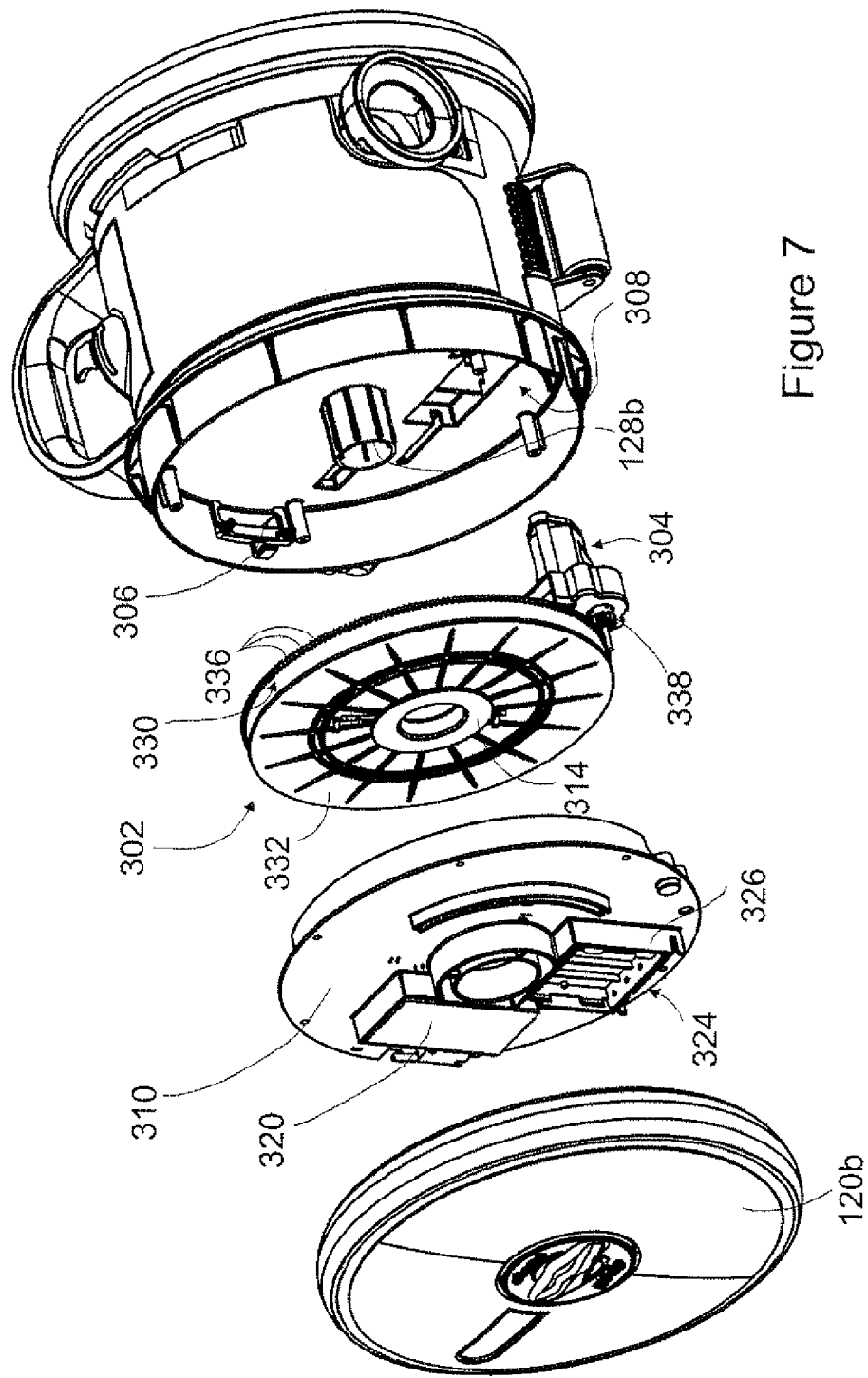
FIG. 7 is a partially exploded view of the surface cleaning apparatus of FIG. 1, with a side wheel, cover plate and cord wrap spool exploded.
Figure 7A:
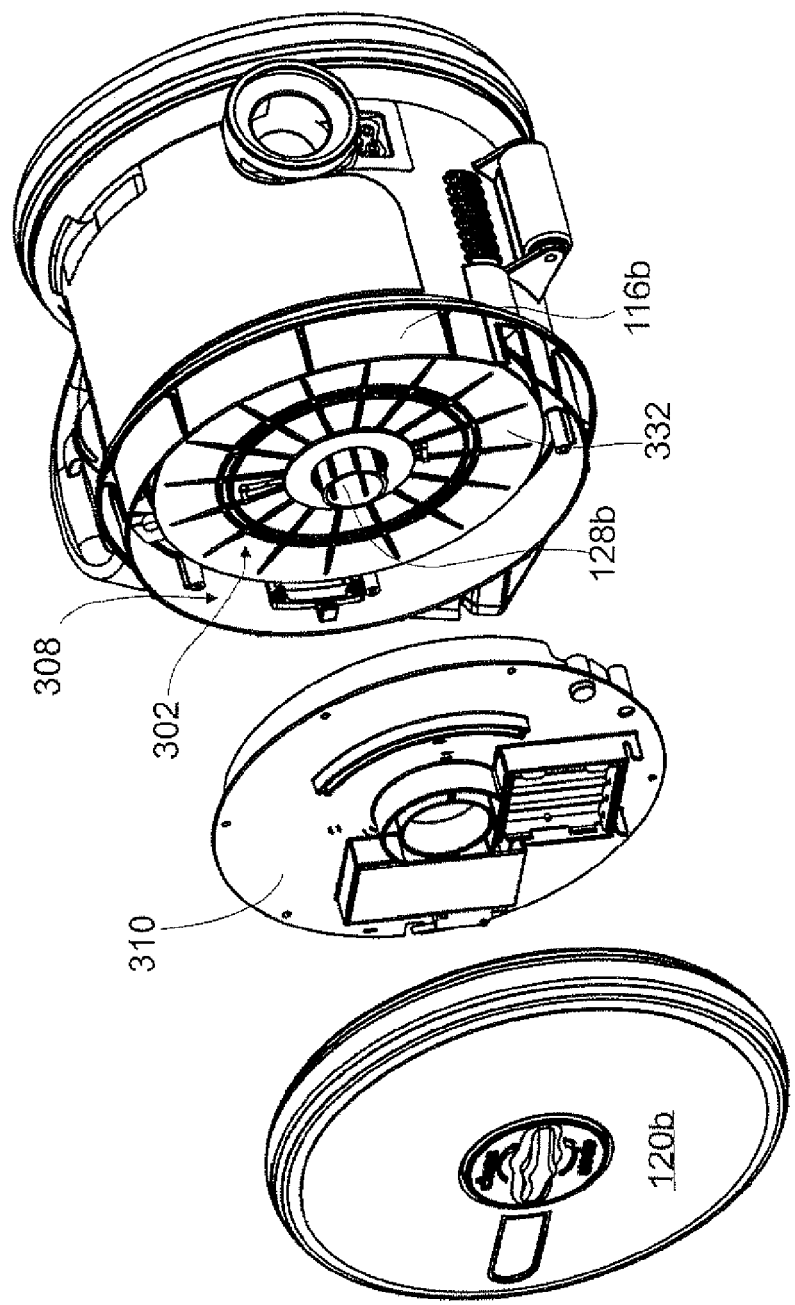
FIG. 7a is the partially exploded view of FIG. 7, with the cord wrap spool in the cord wrap chamber.

In the example illustrated, the cord wrap spool 302 is rotatably received in a cord wrap chamber 308 (FIG. 7*a*). In the example illustrated the cord wrap chamber 308 comprises a recess in the sidewall 116*b.* Optionally, a cover plate 310 can be connected to the sidewall 116*b* to enclose the cord wrap chamber 308, and contain the cord wrap spool 302. The cover plate 310 may be openable, and is preferably removable to allow a user to access the cord wrap chamber 308.

In the illustrated example, the cord wrap spool 302 is rotatable about axle mount 128*b,* and has a spool axis of rotation 312 that is coincident with the primary axis of rotation 130. The cord wrap spool 302 comprises a mounting collar 314 that is non-rotatably connected to the axle mount 128*b.* Referring to FIG. 9, an inward bearing surface 316 on the spool 302 is slidably supported on a complementary collar bearing surface 318 to allow rotation of the spool 302 relative to the body 112. Alternatively, a roller bearing, ball bearing or other type of bearing apparatus can be provided between the spool 302 and the axle mount 128*b.*

Operation of the cord wrap motor 304 can be controlled by an onboard controller 320 that is triggered by a cord wrap switch 322 (see also FIG. 6). Power for the cord wrap motor 304 can be provided by an onboard power source 324. Providing an onboard power source 324 enables the cord wrap spool 302 to be driven to wind the electrical cord even after the electrical cord has been unplugged from the wall socket. The onboard power source 324 can be any type of portable power source, including, for example, one or more batteries contained in a battery compartment 326. Optionally, the batteries can be rechargeable and may be recharged when the electrical cord is plugged in.

Referring to FIGS. 7 and 8, the controller 320 and onboard power source 324 are located in an accessory chamber 328 defined between the outer surface of the cover plate 310 and the side wheel 120*b.* In the example illustrated, the controller 320 and onboard power source 324 are connected to the outer surface of the cover plate 210.

Figure 9:
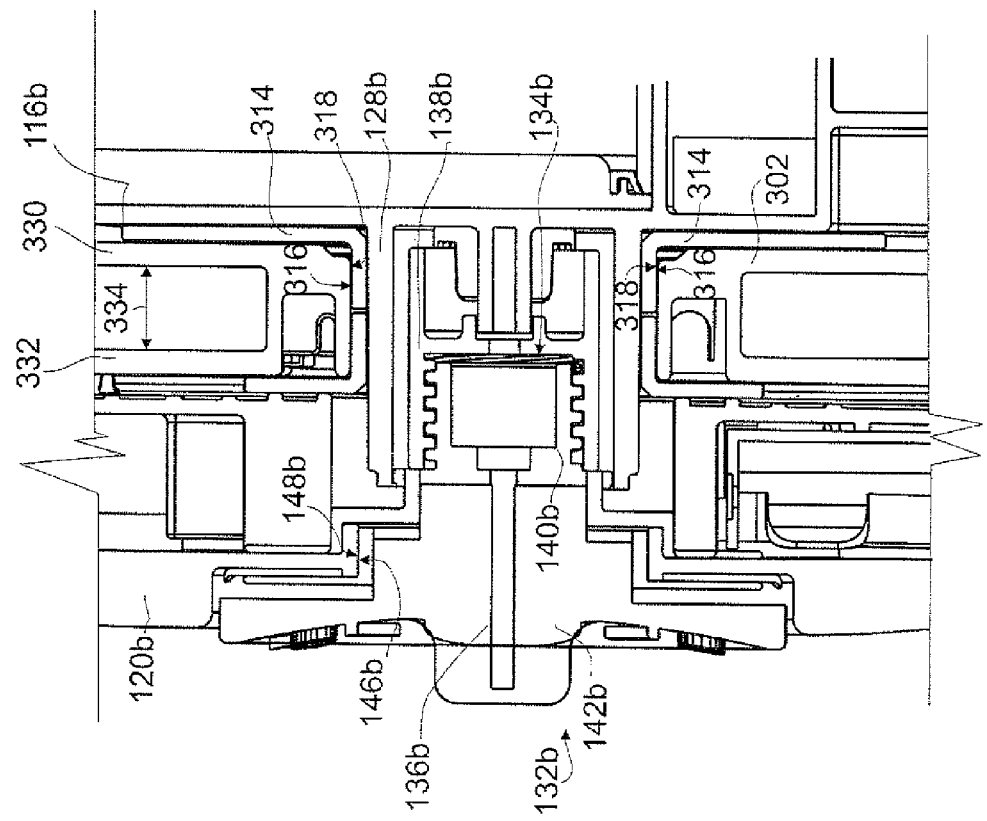
FIG. 9 is an enlarged view of a portion of FIG. 8.

Referring also to FIG. 9, the cord wrap spool 302 comprises an inner flange 330 and an outer flange 332 to help retain the electrical cord wrapped on the spool 302. The inner surfaces of the flanges 330, 332 are separated by a spool width 334. Preferably, the spool width 334 is selected so that it is not an even multiple of the diameter of the electrical cord, for example a standard 4.5 millimeter diameter electrical cord that is to be wrapped on the spool 302. Selecting a spool width 334 that is not an even multiple of the electrical cord diameter, for example setting the spool width to approximately 12 millimeters, may help reduce binding or jamming of the electrical cord as it is wound, or unwound from the spool 302. Preferably, the spool width is between 10% and 90% of the length of the number of widths of the electrical cord that may fit across the spool, and preferably between 20 and 80%.

In the example illustrated, the peripheral edge of the inner flange 330 comprises a plurality of gear teeth 336. The teeth 336 on the perimeter of the inner flange 330 are configured to mesh with the teeth on a drive sprocket 338 that is coupled to the cord wrap motor 304. In this configuration, rotation of the sprocket 338 of the cord wrap motor 304 can cause rotation of the spool 302. Alternatively, instead of integrating gear teeth on the inner flange 330, the spool 302 can be connected to the cord wrap motor 304 using another drive train apparatus, including, for example, a belt drive and a gear train.

Optionally, the cord wrap motor 304 can include a clutch or other disengagement member to decouple the rotation of the spool 302 and the motor when desired, for example when the electrical cord is being unwound from the spool 302. Alternatively, the cord wrap motor 304 can remain drivingly connected to the spool 302 and may be driven in reverse when a user pulls the cord from the spool 302. In this configuration, the controller 320 can include a protection module to help prevent electrical current generated by the rotating motor from damaging or overloading the controller 320.

The cord wrap switch 322 can be any type of electrical switch, or other type of actuator, accessible to the user of the surface cleaning apparatus 100. In the example illustrated, the cord wrap switch comprises a cord wrap pedal 322 that is electrically connected to the controller 320. The cord wrap pedal 322 is preferably pivotally mounted to the rear end of the post-motor filter housing 160, and can pivot between an "off" position and an "on" position. When the cord wrap pedal 322 is pivoted to the on position, the cord wrap motor 304 is activated and the electrical cord can be wound around the spool 302.

Preferably, the cord wrap pedal 322 is biased toward the off position. Biasing the pedal 322 toward the off position may help prevent the cord wrap switch being inadvertently activated when the surface cleaning apparatus 100 is in use.

Alternatively, instead of a foot-actuated pedal 322, the cord wrap switch can be a button, lever or other type of actuator. Optionally, the cord wrap switch can be configured to be engaged by the hands of a user, instead or, or in addition to, being configured to engage a user's foot.

Optionally, the controller 320 can be configured to operate the cord wrap motor 304 at a generally constant wrap speed. The wrap speed can be selected so that the velocity of the tip of the electrical cord is maintained below a predetermined threshold as the cord is wrapped around the spool 302. For example, the cord wrap motor 304 can be configured to rotate at about 100 rpm, which may help limit the velocity at the tip of the cord to between about 5 meters per second and about 0.5 meters per second, and may allow the electrical cord to be wound in between about 5 seconds and about 30 seconds.

Optionally, the controller 320 can be configured to disengage or deactivate the cord wrap motor 304 if the cord wrap spool 302 becomes jammed or otherwise stops rotating, even while the cord wrap pedal 322 is depressed. In the example illustrated, the controller 320 is configured to monitor the electrical current drawn by the cord wrap motor 304. If the spool 302 stops rotating, the sprocket 338 will stop rotating and the current drawn by the cord wrap motor 304 may increase. In response to such a current increase, the controller 320 can reduce or eliminate the power supplied to the cord wrap motor 304. Reducing the power supplied to a non-rotating motor may help reduce motor burn out. Alternatively, instead of monitoring cord wrap motor current, the controller 320 can be configured to monitor rotation of the spool 302, comprise an end stop sensor or switch, or monitor other suitable factors to help determine when the spool 302 has stopped rotating.

The cord wrap motor 304 can operate continuously while the user depresses the cord wrap pedal 322. Providing a continuous, sustained wrapping motion may help facilitate the wrapping of relatively long electrical cords, for example cords in excess of 5.5 meters feet, around the spool 302. In contrast, known spring biased cord winding spools may not be able to provide the sustained wrapping motion to wrap long cords.

Optionally, a manual drive mechanism can be provided to help wind the cord wrap spool 302 if the onboard power source is depleted. For example, a hand crank or other type of manual actuator can be connected to the spool 302 to enable a user to manually wind in the electrical cord.

It will be appreciated that the following claims are not limited to any specific embodiment disclosed herein. Further, it will be appreciated that any one or more of the features disclosed herein may be used in any particular combination or sub-combination, including, without limitation, the cord spool, the protective sidewalls, the cyclone bin assembly lock, an openable or removable wheel to access a component of the surface cleaning apparatus, the positioning and/or configuration of the post motor filter housing, the use of one or more stabilizer wheels, the seal plate, the pre-motor filter window in a wheel, the openable suction motor housing, the wheel axle extending through the filter. The divided dirt collection chamber with the diverter, the asymmetrical orientation of the dirt outlet 180, the threaded wheels, the passage 220 for the divided dirt collection chamber, the side wheels and positioning an operating component in a sidewall of the main body 112.

What has been described above has been intended to be illustrative of the invention and non-limiting and it will be understood by persons skilled in the art that other variants and modifications may be made without departing from the scope of the invention as defined in the claims appended hereto.

The invention claimed is:

1. A cyclone bin assembly comprising:
   (a) a cyclone chamber having an air inlet, an air outlet, a dirt outlet and first and second opposed ends; and,
   (b) a dirt collection chamber in communication with the dirt outlet and surrounding at least a portion of the cyclone chamber, the dirt collection chamber comprising a first opposed end and a second opposed end and comprising a first portion and a second portion, the dirt outlet is positioned adjacent the second opposed end of the dirt collection chamber;
   (c) the first portion and the second portion comprising discrete chambers that are separated from each other by a passage extending between the dirt outlet and a wall of the dirt collection chamber, the first and second portions have first and second sides, the first side positioned adjacent the passage and the second side angularly spaced from the passage; and,
   (d) the second portion has a divider wall that extends inwardly towards the second opposed end of the dirt collection chamber from the first opposed end of the dirt collection chamber and the divider wall is spaced from the second side.

2. The cyclone bin assembly of claim 1 wherein the divider wall is positioned adjacent the first side.

3. The cyclone bin assembly of claim 1 wherein a portion of the wall facing the dirt outlet extends inwardly towards the dirt outlet.

4. The cyclone bin assembly of claim 2 wherein the cyclone chamber has a longitudinal axis, the dirt outlet has a height in a direction of the longitudinal axis and the portion of the wall has a height so as to extend along the height of the dirt outlet.

5. The cyclone bin assembly of claim 3 wherein the portion of the wall extends away from the dirt outlet along at least a portion of a length of the cyclone chamber.

6. The cyclone bin assembly of claim 1 wherein the dirt outlet is positioned adjacent the second opposed end of the dirt collection chamber and the passage terminates prior to the first opposed end of the dirt collection chamber.

7. The cyclone bin assembly of claim 1 wherein a portion of the wall facing the dirt outlet extends inwardly towards the dirt outlet.

8. The cyclone bin assembly of claim 1 wherein a portion of the wall facing the dirt outlet extends convexly inwardly towards the dirt outlet.

9. A vacuum cleaner comprising an air flow path extending from a dirty air inlet to a clean air outlet, the air flow path including a suction motor in a suction motor housing and the cyclone bin assembly of claim 7, wherein the portion of the wall is configured to seat on a portion of the suction motor housing.

10. A vacuum cleaner comprising an air flow path extending from a dirty air inlet to a clean air outlet, the air flow path including a suction motor in a suction motor housing and the cyclone bin assembly of claim 1, wherein the first and second portions are configured to be positioned on opposed sides of the suction motor.

11. The cyclone bin assembly of claim 1 wherein the air inlet and the air outlet are at the first opposed end of the cyclone chamber.

12. The cyclone bin assembly of claim 1 wherein the cyclone chamber comprises a sidewall extending between the first and second opposed ends and the dirt outlet comprises a slot that is provided in the sidewall adjacent the second opposed end.

13. The cyclone bin assembly of claim 12 wherein a portion of the sidewall terminates prior to the second opposed end and defines a terminal end of the sidewall, the terminal end extending part way around the cyclone chamber.

14. The cyclone bin assembly of claim 1 wherein the dirt outlet has an angular extent around the cyclone chamber and a larger portion of the angular extent of the slot faces the first portion.

15. The cyclone bin assembly of claim 14 wherein the cyclone chamber has a direction of rotation and the first portion is angularly positioned upstream of the second portion in the direction of rotation.

16. The cyclone bin assembly of claim 1 wherein the cyclone chamber has a longitudinal axis that is essentially horizontal.

17. The cyclone bin assembly of claim 16 wherein the dirt outlet is provided in a lower portion of the cyclone chamber and has a portion that is positioned at an upper end of the dirt collection chamber.

18. The cyclone bin assembly of claim 16 wherein the dirt outlet has a portion that is positioned at an upper end of one of the first and second portions.

19. The cyclone bin assembly of claim 16 wherein the dirt outlet has a portion that is positioned at an upper end of the first portion.

20. The cyclone bin assembly of claim 1 wherein the portion of the wall is configured to produce an airstream traveling through the passage between the first and second portions that has a velocity that is greater than a velocity of the airstream immediately upstream and downstream of the passage.

21. The cyclone bin assembly of claim 1 wherein the cyclone chamber has a direction of rotation and the first portion is angularly positioned upstream of the second portion in the direction of rotation.

* * * * *